United States Patent
Wu et al.

(10) Patent No.: US 11,491,406 B2
(45) Date of Patent: *Nov. 8, 2022

(54) GAME DRAWER

(71) Applicant: Snap Inc., Santa Monica, CA (US)

(72) Inventors: William Wu, Marina del Rey, CA (US); Dylan Shane Eirinberg, Venice, CA (US); Alexander R. Osborne, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/949,917

(22) Filed: Nov. 20, 2020

(65) Prior Publication Data

US 2021/0069601 A1    Mar. 11, 2021

Related U.S. Application Data

(63) Continuation of application No. 16/177,320, filed on Oct. 31, 2018, now Pat. No. 11,103,795.

(51) Int. Cl.
| | | |
|---|---|---|
| *A63F 9/24* | (2006.01) | |
| *A63F 11/00* | (2006.01) | |
| *G06F 13/00* | (2006.01) | |
| *G06F 17/00* | (2019.01) | |
| *A63F 13/87* | (2014.01) | |

(52) U.S. Cl.
CPC .................................. *A63F 13/87* (2014.09)

(58) Field of Classification Search
CPC ... G07F 17/32; G07F 17/3211; G07F 17/3213
USPC ......................... 463/1, 20, 22, 25, 39, 40, 42
See application file for complete search history.

(56) References Cited

U.S. PATENT DOCUMENTS

| | | |
|---|---|---|
| 7,828,656 B2 | 11/2010 | Paulsen et al. |
| 8,103,734 B2 | 1/2012 | Galli et al. |
| 8,821,297 B1 | 9/2014 | Nagata et al. |
| 9,197,427 B2 | 11/2015 | Chazin et al. |
| 9,959,037 B2 | 5/2018 | Chaudhri et al. |

(Continued)

FOREIGN PATENT DOCUMENTS

| | | |
|---|---|---|
| CN | 1434623 | 8/2003 |
| CN | 102868588 | 1/2013 |

(Continued)

OTHER PUBLICATIONS

U.S. Appl. No. 16/948,429, filed Sep. 17, 2020, Messaging System Including an External-Resource Dock and Drawer.

(Continued)

*Primary Examiner* — Adetokunbo O Torimiro
(74) *Attorney, Agent, or Firm* — Schwegman Lundberg & Woessner, P.A.

(57) ABSTRACT

Aspects of the present disclosure involve a system comprising a computer-readable storage medium storing at least one program and a method for presenting a conversation interface in a messaging application to enable a plurality of participants in a conversation to exchange messages with each other. A request from a participant of the plurality of participants to view a list of gaming applications is received. In response to receiving the request, a size of a display region in which to present the list of gaming applications to the participant is determined. Based on the determined size of the display region, a presentation format is selected for displaying the list of gaming applications.

20 Claims, 13 Drawing Sheets

(56) References Cited

U.S. PATENT DOCUMENTS

| | | |
|---|---|---|
| 10,913,004 B1 | 2/2021 | Wu et al. |
| 11,103,795 B1 | 8/2021 | Wu et al. |
| 11,356,392 B2 | 6/2022 | Desserrey et al. |
| 2007/0038701 A1 | 2/2007 | Majors et al. |
| 2008/0104379 A1 | 5/2008 | Peterman et al. |
| 2009/0164936 A1 | 6/2009 | Kawaguchi |
| 2010/0251142 A1 | 9/2010 | Geppert et al. |
| 2011/0184886 A1 | 7/2011 | Shoham |
| 2011/0302509 A1 | 12/2011 | Leacock et al. |
| 2011/0319175 A1 | 12/2011 | Jensen |
| 2013/0218987 A1 | 8/2013 | Chudge et al. |
| 2014/0068467 A1 | 3/2014 | Van et al. |
| 2014/0298210 A1 | 10/2014 | Park et al. |
| 2015/0012842 A1 | 1/2015 | Kuscher et al. |
| 2015/0038235 A1 | 2/2015 | Kamekawa |
| 2015/0163258 A1 | 6/2015 | Garcia, III et al. |
| 2015/0195220 A1 | 7/2015 | Hawker et al. |
| 2016/0092035 A1 | 3/2016 | Crocker et al. |
| 2017/0046024 A1 | 2/2017 | Dascola et al. |
| 2017/0279859 A1 | 9/2017 | Pogorelik |
| 2017/0357443 A1 | 12/2017 | Paek et al. |
| 2018/0227534 A1 | 8/2018 | Zhou et al. |
| 2018/0331839 A1 | 11/2018 | Gao et al. |
| 2018/0367483 A1 | 12/2018 | Rodriguez et al. |
| 2019/0036989 A1 | 1/2019 | Eirinberg et al. |
| 2019/0272064 A1 | 9/2019 | Ghassabian |
| 2020/0379617 A1 | 12/2020 | Chang et al. |
| 2020/0380003 A1 | 12/2020 | Abbasi Moghaddam et al. |
| 2021/0044559 A1 | 2/2021 | Jain et al. |
| 2021/0149553 A1 | 5/2021 | Lereya et al. |
| 2021/0392096 A1 | 12/2021 | Desserrey et al. |

FOREIGN PATENT DOCUMENTS

| | | |
|---|---|---|
| CN | 103649985 | 3/2014 |
| CN | 110945858 | 3/2020 |
| EP | 2475137 | 7/2012 |
| KR | 20130050871 | 5/2013 |
| KR | 20160075457 | 6/2016 |
| KR | 20170068379 | 6/2017 |
| WO | 2019023596 | 1/2019 |

OTHER PUBLICATIONS

U.S. Appl. No. 16/177,320, filed Oct. 31, 2018, Game Drawer.

"U.S. Appl. No. 16/177,320, Final Office Action dated Jun. 12, 2020", 8 pgs.

"U.S. Appl. No. 16/177,320, Non Final Office Action dated Jan. 14, 2020", 8 pgs.

"U.S. Appl. No. 16/177,320, Notice of Allowance dated Aug. 21, 2020", 7 pgs.

"U.S. Appl. No. 16/177,320, Response filed Apr. 3, 2020 to Non Final Office Action dated Jan. 14, 2020", 10 pgs.

"U.S. Appl. No. 16/177,320, Response filed Jul. 20, 2020 to Final Office Action dated Jun. 12, 2020", 10 pgs.

"International Application Serial No. PCT/US2018/044122, International Search Report dated Nov. 12, 2018", 3 pgs.

"International Application Serial No. PCT/US2018/044122, Written Opinion dated Nov. 12, 2018", 5 pgs.

"U.S. Appl. No. 15/818,430, Non Final Office Action dated Jun. 10, 2019", 15 pgs.

"U.S. Appl. No. 15/818,430, Response filed Sep. 10, 2019 to Non-Final Office Action dated Jun. 10, 2019", 11 pgs.

"U.S. Appl. No. 15/818,430, Final Office Action dated Oct. 29, 2019", 17 pgs.

"U.S. Appl. No. 15/818,430, Response filed Jan. 29, 2020 to Final Office Action dated Oct. 29, 2019", 10 pgs.

"International Application Serial No. PCT/US2018/044122, International Preliminary Report on Patentability dated Feb. 6, 2020", 7 pgs.

"U.S. Appl. No. 15/818,430, Non Final Office Action dated Mar. 10, 2020", 18 pgs.

"U.S. Appl. No. 15/818,430, Response filed Jun. 10, 2020 to Non Final Office Action dated Mar. 10, 2020", 10 pgs.

"European Application Serial No. 18838485.3, Extended European Search Report dated Jun. 16, 2020", 8 pgs.

"U.S. Appl. No. 15/818,430, Examiner Interview Summary dated Jun. 16, 2020", 3 pgs.

"U.S. Appl. No. 15/818,430, Final Office Action dated Jul. 15, 2020", 23 pgs.

"U.S. Appl. No. 15/818,430, Response filed Oct. 15, 2020 to Final Office Action dated Jul. 15, 2020", 10 pgs.

"U.S. Appl. No. 15/818,430, Examiner Interview Summary dated Oct. 22, 2020", 2 pgs.

"Chinese Application Serial No. 201880049601.8, Office Action dated Aug. 27, 2020", w/ English Translation, 12 pgs.

"U.S. Appl. No. 15/818,430, Non Final Office Action dated Nov. 3, 2020", 23 pgs.

"Korean Application Serial No. 10-2020-7005774, Notice of Preliminary Rejection dated Dec. 7, 2020", w/ English Translation, 9 pgs.

Osborne, Alexander R., "Messaging and Gaming Applications Communication Platform", U.S. Appl. No. 16/177,335, filed Oct. 31, 2018, 59 pgs.

Osborne, Alexander R., "In-Game Status Bar", U.S. Appl. No. 16/177,332, filed Oct. 31, 2018, 72 pgs.

Osborne, Alexander R, "Games in Chat", U.S. Appl. No. 16/177,318, filed Oct. 31, 2018, 85 pgs.

"U.S. Appl. No. 16/177,320, Notice of Allowance dated Apr. 27, 2021", 5 pgs.

"U.S. Appl. No. 16/177,320, PTO Response to Rule 312 Communication dated Feb. 4, 2021", 2 pgs.

"U.S. Appl. No. 16/948,429, 312 Amendment filed Apr. 25, 2022", 3 pgs.

"U.S. Appl. No. 16/948,429, Corrected Notice of Allowability dated Feb. 23, 2022", 2 pgs.

"U.S. Appl. No. 16/948,429, Non Final Office Action dated Sep. 16, 2021", 14 pgs.

"U.S. Appl. No. 16/948,429, Notice of Allowance dated Feb. 1, 2022", 7 pgs.

"U.S. Appl. No. 16/948,429, Response filed Dec. 16, 2021 to Non Final Office Action dated Sep. 16, 2021", 10 pgs.

GAME DRAWER

CLAIM OF PRIORITY

This application is a continuation of U.S. patent application Ser. No. 16/177,320, filed on Oct. 31, 2018, which is incorporated herein by reference in its entirety.

TECHNICAL FIELD

The present disclosure relates generally to messaging systems and more particularly to messaging within gaming applications.

BACKGROUND

The popularity of users interacting with other users online continues to grow. There are many ways for users to interact online with other users. Users can communicate with their friends using messaging applications and can play with other users online in multiplayer video games. However, there remains a disconnect between the people the user communicates with using the messaging applications and the people the user plays with in the multiplayer video games. In particular, a user typically has to leave a certain video game the user is playing to communicate with the user's friends through the messaging application, and the user has to leave a conversation the user is having in the messaging application to play the video game.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings, in which.

DETAILED DESCRIPTION

Figure 1:
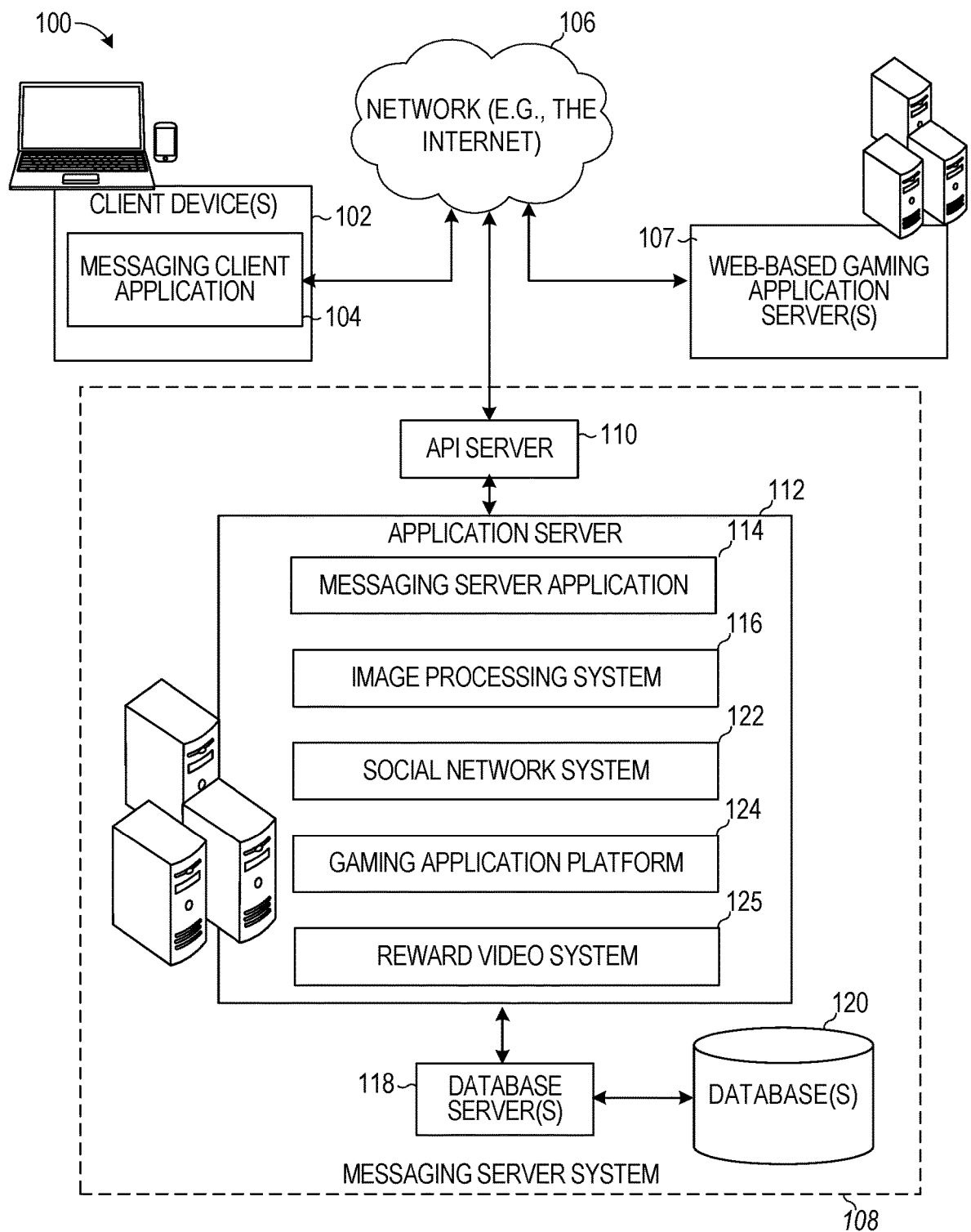
FIG. 1 is a block diagram showing an example messaging system for exchanging data (e.g., messages and associated content) over a network, according to example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, those skilled in the art, that embodiments may be practiced without these specific details. In general, well-known instruction instances, protocols, structures, and techniques are not necessarily shown in detail.

Often, users utilize a messaging application to talk to their friends and a multiplayer video game to play with a known or an unknown group of users (a group that may not include their friends from the messaging application). This leaves the users with having to choose whether to talk to their friends on the messaging application or play with strangers in a video game application. In addition, while certain video game applications allow the user to chat with other users in the video game application, such chatting is limited to the users of the video game application (which may not include the user's friends on the messaging application) and has to be performed through the graphical user interface (GUI) of the video game application. The disclosed embodiments improve the functionality of messaging application software and systems by providing participants in a conversation in the messaging application a seamless way to join together to playa gaming application. The disclosed embodiments improve the functionality of messaging application software and systems by providing a unique user interface for participants to select a gaming application from a list in which the display format for presenting gaming applications representations is based on the device being used.

Specifically, the disclosed embodiments provide an improved GUI that enables users to quickly access a game and play the game with the same friends they are chatting with. Conventional user interfaces have many deficits relating to the efficient functioning of the computer, requiring a user to exit a given conversation they may be having with their friends to search for a gaming application to play and then forcing the user to individually search for and identify friends to play the game with. The presentation style conventional user interfaces use for enabling selection of gaming applications typically does not take advantage of all of the screen space that is available on a given device, which results in a large amount of whitespace on the screen and distribution of the gaming applications across various pages on the device. This leaves the user with having to navigate many more screens to find a gaming application they are looking for, resulting in a poor user experience and reduced efficiency.

In addition, conventional user interfaces limit the user to using the launched game interface to find their friends, which may be an unfamiliar and difficult user interface for the user to use. Once the user in conventional systems manages to find friends to play with, they are limited to the GUI of the game to communicate with those friends which may lack certain messaging features (e.g., avatars and voice communication) the user enjoys using with a messaging application. This conventional process of launching a game to play with a select group of friends and communicating in the game could seem slow, complex, and difficult to learn, particularly to novice users. The disclosed embodiments improve the efficiency of using the electronic device by bringing together a limited list of gaming applications which can be accessed directly from a conversation interface.

The disclosed embodiments streamline the process for the user to playa game with friends by selecting a presentation format for presenting a list of gaming applications on the device being used by a user and allowing the user to select and launch a game from the list within the same GUI the user is using to talk to their friends. Once the game is launched, all of the friends the user is having the conversation with are able to quickly and seamlessly join the user in the game, which avoids forcing the user to search for and individually invite friends to play as in many conventional systems. This significantly improves the user experience, reduces the amount of whitespace on the screen, reduces the number of steps a user has to perform to select and launch a game, and makes playing the games more enjoyable. This is because the user can find gaming applications to play with their friends and easily launch and join their friends in playing these games without actually searching for and opening up different interfaces to find a game to play and then having to find friends within the gaming interface to play with. Rather than paging through multiple screens of gaming applications and menus to find friends to play with, only a few steps may be needed from a conversation interface to reach and launch a select gaming application.

Integrating the ability to launch and join a gaming application from a conversation in a messaging application allows participants in a conversation to quickly and easily see who is playing a given game and join those players. Because the game is launched from within a given conversation in the messaging application, the conversation participants can continue their conversation and play the game together. Namely, the conversation participants do not have to leave their conversation to play the game. This significantly improves the overall user experience. In addition, by adaptively modifying the display format used to present the user with representations of available gaming applications (e.g., using box art or cover art for each game) based on a size of the display area of the list, the amount of whitespace used to present the representations is minimized and the aspect ratio of each representation is optimized. In this way, the display area available for presenting representations of gaming applications is utilized to the fullest extent while preserving image quality of gaming application representations. This significantly helps the user navigate through the available gaming applications to select a gaming application to launch and play with participants of a conversation.

FIG. 1 is a block diagram showing an example messaging system 100 for exchanging data (e.g., messages and associated content) over a network 106. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video, or other multimedia data).

Each messaging client application 104 is also able to communicate with one or more web-based gaming application server(s) 107. Each web-based gaming application server 107 hosts an HTML5-based game (or any other suitable web-based or markup-language-based game). Particularly, the messaging client application 104 launches a web-based game by accessing the HTML5 file from the web-based gaming application server 107 associated with the game. In certain embodiments, the games hosted by web-based gaming application server 107 are programmed in JavaScript leveraging an SDK stored on the gaming application platform 124 provided by the messaging server system 108. The SDK includes application programming interfaces (APIs) with functions that can be called or invoked by the web-based gaming application. In certain embodiments, the gaming application platform 124 includes a JavaScript library that provides a given gaming application access to certain user data of the messaging client application 104. HTML5 is used as an example technology for programming games, according to some embodiments, but games programmed based on other technologies can be used.

In order to integrate the functions of the SDK into the game, the SDK is downloaded by the web-based gaming application server 107 from the messaging server system 108 or is otherwise received by the web-based gaming application server 107. Once downloaded or received, the SDK is included as part of the application code of the web-based game. The code of the web-based game can then call or invoke certain functions of the SDK to integrate features of the messaging client application 104 into the web-based gaming application. Some of the functions and functionality of the SDK, which the web-based gaming application and the messaging client application 104 can call, are discussed in detail in commonly-owned, commonly-assigned Alexander R. Osborne et al., U.S. patent application Ser. No. 16/177,335, filed Oct. 31, 2018, entitled "MESSAGING AND GAMING APPLICATIONS COMMUNICATION PLATFORM," which is hereby incorporated by reference.

For example, upon being launched, the gaming application can invoke an initialize function of the SDK (e.g., using the gaming application platform 124) to obtain various features of the messaging client application 104. Once invoked, the initialize function causes the messaging client application 104 to generate a response message for transmission to the gaming application. Specifically, the messaging client application 104 may include in the response message a conversation identifier, a gaming application identifier, one or more attributes of the conversation (e.g., conversation size, participants, font color of each participant's message text), user identifier information, display screen parameters (indicating regions of the display that can be occupied by the gaming user interface and regions of the display that will be occupied by the features of the messaging client application 104), a context (e.g., whether the game was launched from a discovery screen of the messaging client application 104, a conversation, an instant message, a non-conversation interface, etc.), and a geographical region. The web-based gaming application sever(s) 107 processes the message returned from the messaging client application 104 to determine the context from which the gaming application was launched.

As another example, the messaging client application 104 shares user data with the web-based gaming application based on the context from which the game was launched using the gaming application platform 124. Specifically, if the game was launched from a conversation, the messaging application includes attributes of the conversation in a response message for transmission to the gaming application. In response to receiving the conversation attributes, the gaming application presents data from the conversation (e.g., identifiers of conversation participants, font colors of the participant messages, etc.) together with the gaming interface to integrate the conversation into the game. Alternatively, if the game was launched from a discovery screen (or a non-conversation interface), only the user identifier may be provided and shared with the gaming application. In response to the game receiving a user request to invite another user to the game, the game invokes a play-with-friends function to cause the messaging application to present a list of the user's friends to the user (without actually sending the list of friends to the game). Once the user selects the friends from the list the friends whom the user would like to invite to the game, the identifiers of only the selected friends are transmitted from the messaging application to the gaming application to add the selected friends to the gaming interface and integrate the selected friends into the game via the platform.

As another example, the web-based gaming application server(s) 107 is authorized to integrate features of the messaging application using the gaming application platform 124. At prespecified time intervals (e.g., every 90 seconds), the gaming application invokes the token authentication function to provide an authentication token. A message is sent to the messaging application through the gaming platform indicating that the token authentication function was invoked. In response, the messaging application determines whether the gaming application calling the function is allowed to communicate with the messaging application. If the gaming application is allowed to communicate with the messaging application, the messaging application provides a unique token in a response message via the gaming application platform 124 to the gaming application. In certain embodiments, a gaming application is determined to be allowed to communicate with the messaging application if the gaming application was launched directly from the messaging application. In this way, if the user tried to access the gaming application through a website associated with the gaming application without going through the messaging application, the gaming application will be determined to not be allowed to communicate with the messaging application and will not be provided with the authentication token. Additional gaming data needed to run the gaming application will not be accessible to the game, which in turn restricts the gaming application to being allowed to be launched only directly through the messaging application. The token provided in the message from the messaging application to the gaming application may only be valid for 90 seconds. If the gaming application communicates with an expired token with the messaging application, the gaming application will not get a response from the messaging application or will be instructed by the messaging application that the token is expired. Further gaming data (e.g., gaming application data 207) will no longer be made available to the gaming application.

As another example, a social-based feature of the messaging application is prevented from being available to the web-based gaming application using the gaming application platform 124. For example, if the game was launched from a discovery screen (or a non-conversation interface), only the user identifier may be provided and shared with the gaming application. In response to the game receiving a user request to invite another user to the game, the game invokes a play-with-friends function to cause the messaging application to present a list of the user's friends to the user (without actually sending the list of friends to the game). Once the user selects those friends from the list whom the user would like to invite to the game, the identifiers of only those selected friends are transmitted from the messaging application to the gaming application to add those friends to the gaming application interface and integrate those friends into the game.

As another example, the user's avatar from the messaging application may only be made available to the gaming application in response to the gaming application invoking a fetch-avatar-image function. Specifically, the gaming application may determine a need to include a user's avatar next to score information presented in the gaming application. In this scenario, the gaming application, after being launched, invokes the fetch-avatar-image function, which passes a message to the messaging application with the user's identification information. The messaging application then generates a response message that includes an image representing the user's avatar obtained from the messaging application (or a link to the avatar image) and provides the response to the gaming application through the gaming application platform 124. The gaming application then integrates the user's avatar by displaying the avatar next to the score information in the game interface.

As another example, the gaming application platform 124 provides a reward video to the web-based gaming application and a leaderboard. The messaging application receives, via the platform 124, from the web-based gaming application, a reward video request. For example, the gaming application may decide to give the user the opportunity to purchase or receive an upgrade at a reduced cost or for free if the user watches one or more advertisements. In response, the gaming application invokes a reward-video-related function to cause one or more advertisements to be presented to the user. As an example, the gaming application invokes a get-unconsumed-reward video function. This function causes the messaging application to retrieve an advertisement video from the reward video system 125 that the reward video system 125 determines, based on a user profile, has not been delivered to the user. The messaging application provides the gaming application a unique identifier of each selected reward video. As another example, the gaming application invokes a retrieve-reward-video function that provides the unique identifier of the reward video. This function causes the messaging application prepare a reward video advertisement corresponding to the unique identifier be displayed later during gameplay. This ensures that when the user decides view a reward video advertisement, the advertisement can be delivered to the user without delay. Specifically, in response to determining that the retrieve reward video function has been invoked by the gaming application, the messaging application communicates with the reward video system 125 to select and mark one or more video advertisements that match a user profile and that match the unique identifier provided by the gaming application. These selected and marked video advertisements are cached in a user's profile for a prespecified period of time until the gaming application informs the messaging application to present the cached video advertisements by way of invoking a watch-reward-video function. In some cases, the gaming application invokes a reward-video-ready function to determine whether the one or more video advertisements matching a unique identifier have been cached by the messaging application and are ready to present to the user. In some cases, the messaging application invokes a reward-video-ready function to inform the gaming application that the requested reward video advertisement is ready to be shown to the user. This function may include the unique identifier of the reward video that is ready to be presented.

The messaging application transmits, via the platform 124, to the web-based gaming application, an indication of consumption of the reward video. For example, once the messaging application starts presenting the reward video to the user in response to the watch-reward-video function being invoked, the messaging application informs the gaming application through the platform that the reward video matching a unique identifier has started being consumed. The gaming application may invoke a consume reward video function to inform the messaging application that the reward video has been consumed. The messaging application may invoke a reward-video-complete function to inform the gaming application that the requested reward video advertisement matching the unique identifier has been completely consumed by the user. In some implementations, the gaming application, in response to receiving the message from this function that the reward video was consumed, makes available to the user the reward associated with the video (e.g., the selected game upgrade or update to the score).

As another example, a leaderboard managed by the messaging application is updated in response to receiving game score information from the web-based gaming application via platform 124. For example, the gaming application may invoke a submit-score-to-leaderboard function. This function may include a leaderboard identifier and score information that are passed in a message to the messaging application. Based on the leaderboard identifier and score information, the messaging application updates the corresponding leaderboard associated with the leaderboard identifier with the updated score information. In this way, the messaging application can maintain a leaderboard for a game without providing the game any sensitive information about who is in the leaderboard. Namely, the messaging application, rather than the gaming application, maintains the leaderboard and has exclusive access to updating the leaderboard. The messaging application may determine leaders on the leaderboard on a geographical region basis or among a user's friends. The leaderboard is presented by the messaging application to a user in response to receiving a leaderboard request from the web-based gaming application. For example, when the gaming application determines a need to present a leaderboard to a user (e.g., at the end of a stage or match or in response to receiving a user selection of a leaderboard button), the gaming application invokes a leaderboard function. The leaderboard function passes a message to the messaging application that identifies the leaderboard and causes the messaging application to present the leaderboard corresponding to the leaderboard identifier to the user. In this way, the leaderboard can be presented to the user without providing information to the gaming application about the status of various users on the leaderboard.

As another example, the gaming application platform 124 allows the messaging application to communicate volume settings, focus information, and loading information between the messaging application and the web-based gaming application. The messaging application transmits to the gaming application, via the gaming application platform 124, a volume level of the web-based gaming application. For example, during gameplay in the gaming application, a user may decide to conduct a voice party with the user's friends who are in the conversation and playing the game. The voice party may allow each of the users to talk via a microphone and hear each other through the speakers during gameplay, avoiding the need to type messages during gameplay. In response to the messaging application detecting activation of the voice party feature of the messaging application, the messaging application may invoke the function to set a volume of the web-based gaming application. Specifically, this function may pass a message to the gaming application from the messaging application, setting a volume of the web-based gaming application relative to the volume of the voices output by the speakers.

In some implementations, the gaming application does not receive information from the messaging application about the level of the volume of the voice party line or any of the communications on the voice party line. All of the user's voice information is exchanged solely through the messaging application and the voice information and processing is handled by the messaging application. The messaging application simply informs the gaming application to set the volume to a particular level that the messaging application selects based on the volume set for the voice party line. In some other implementations, the volume of the voice party line is communicated to the gaming application with an instruction indicating how much to set the gaming application volume relative to the voice party line volume.

At least one of an indication of a user's focus or display screen parameters are transmitted, via the platform, from the messaging application to the web-based gaming application. For example, the messaging application invokes a did-lose-focus function to inform the gaming application that the user has lost focus from the game and why. This informs the game that certain game elements cannot be selected on the screen because the user's focus has shifted to a different application or a different feature of the messaging application. The feature may block the portion of the screen displaying the web-based gaming application, which prevents the user from interacting with the game. In response, the gaming application pauses or terminates gameplay. The messaging application may invoke a did-gain-focus function to inform the game that the user has re-gained focus for the game. This means that the user has stopped focusing on the application or feature that was obstructing view of the game and can now again interact with the game. In response, the gaming application may resume gameplay.

The SDK stored on gaming application platform 124 effectively provides the bridge between the web-based gaming application and the messaging client application 104. This provides the user with a seamless experience of communicating with their friends on the messaging client application 104, preserving the look and feel of the messaging client application 104 while playing a web-based gaming application. To bridge the web-based gaming application and the messaging client application 104, in certain embodiments, the SDK facilitates communication between the web-based gaming application server 107 and the messaging client application 104. In certain embodiments, a WebViewJavaScriptBridge running on a client device 102 establishes two one-way communication channels between the web-based gaming application and the messaging client application 104. Messages are sent between the web-based gaming application and the messaging client application 104 via these communication channels asynchronously. Each SDK function invocation is sent as a message, and callback for each SDK function is implemented by constructing a unique callback identifier and sending a message with that callback identifier.

By utilizing the SDK, not all of the information from the messaging client application 104 is shared with the web-based gaming application server 107. The SDK limits which information is shared based on the needs of the web-based gaming application and based on a context from which the web-based gaming application was launched by the messaging client application 104. Also, by using the SDK, the gaming application is provided with information as the state from which the gaming application was launched from the messaging application. Based on this state information, functionality of a communication interface provided by the gaming application can be modified.

In certain embodiments, each web-based gaming application server 107 provides the HTML5 file corresponding to the web-based gaming application to the messaging server system 108. The messaging server system 108 can add a visual representation of the game in the messaging client application 104. The visual representation can be a box art of the gaming application or just text with the title of the gaming application. The box art (or cover art) includes an artwork as an illustration or photograph that visually identifies, describes, and/or promotes the gaming application. The box art is artistically connected to the gaming application and is created with art by the creator of the gaming application. Once the user selects the visual representation or instructs the messaging client application 104 through a GUI of the messaging client application 104 to launch the game (as discussed below), the messaging client application 104 obtains the HTML5 file and initiates all the resources necessary to launch the game. In some cases, the messaging client application 104 accesses the corresponding web-based gaming application server 107 to launch the game.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, virtual objects, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server receives and transmits message data (e.g., commands and message payloads) between the client device 102 and the application server 112. Specifically, the API server 110 provides a set of interfaces (e.g., routines and protocols) that can be called or queried by the messaging client application 104 and the web-based gaming application server 107 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to the messaging server application 114, and for possible access by another messaging client application 104; the setting of a collection of media data (e.g., story); the retrieval of such collections; the retrieval of a list of friends of a user of a client device 102; the retrieval of messages and content; the adding and deleting of friends to a social graph; the location of friends within a social graph; access to reward videos stored on reward video system 125; access to user conversation data; access to avatar information stored on messaging server system 108; access to authentication tokens; access to a leaderboard; access to game score information; and opening an application event (e.g., relating to the messaging client application 104).

The application server 112 hosts a number of applications and subsystems, including a messaging server application 114, an image processing system 116, a social network system 122, gaming application platform 124, and reward video system 125. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions and services and makes these functions and services available to the messaging server application 114. To this end, the social network system 122 maintains and accesses an entity graph within the database 120. Examples of functions and services supported by the social network system 122 include the identification of other users of the messaging system 100 with which a particular user has relationships or is "following" and also the identification of other entities and interests of a particular user. Such other users may be referred to as the user's friends.

The reward video system 125 stores multiple advertisements. These advertisements may include a collection of video clips (e.g., 30-40 second video clips). A given web-based gaming application can use the advertisements stored on reward video system 125 to provide a reward to a user in the web-based gaming application. For example, a user can be provided with the option to watch a given advertisement in the video game to advance a level, to upgrade armor or weapons, to increase a score, or to purchase game content. The reward video system 125 can include a collection of profiles for each user of the messaging server system 108. Based on the profiles, the reward video system 125 can select advertisements suitable for or that may interest a given user. The reward video system 125 may also keep track of which advertisements each user of the messaging server system 108 has watched to avoid presenting the same advertisements multiple times to the same user. Leveraging the reward video system 125 managed by the messaging server system 108 avoids the web-based gaming application server 107 having to obtain and manage its own advertisements.

The application server 112 is communicatively coupled to a database server 118, which facilitates access to a database 120 in which is stored data associated with messages processed by the messaging server application 114.

Figure 2:
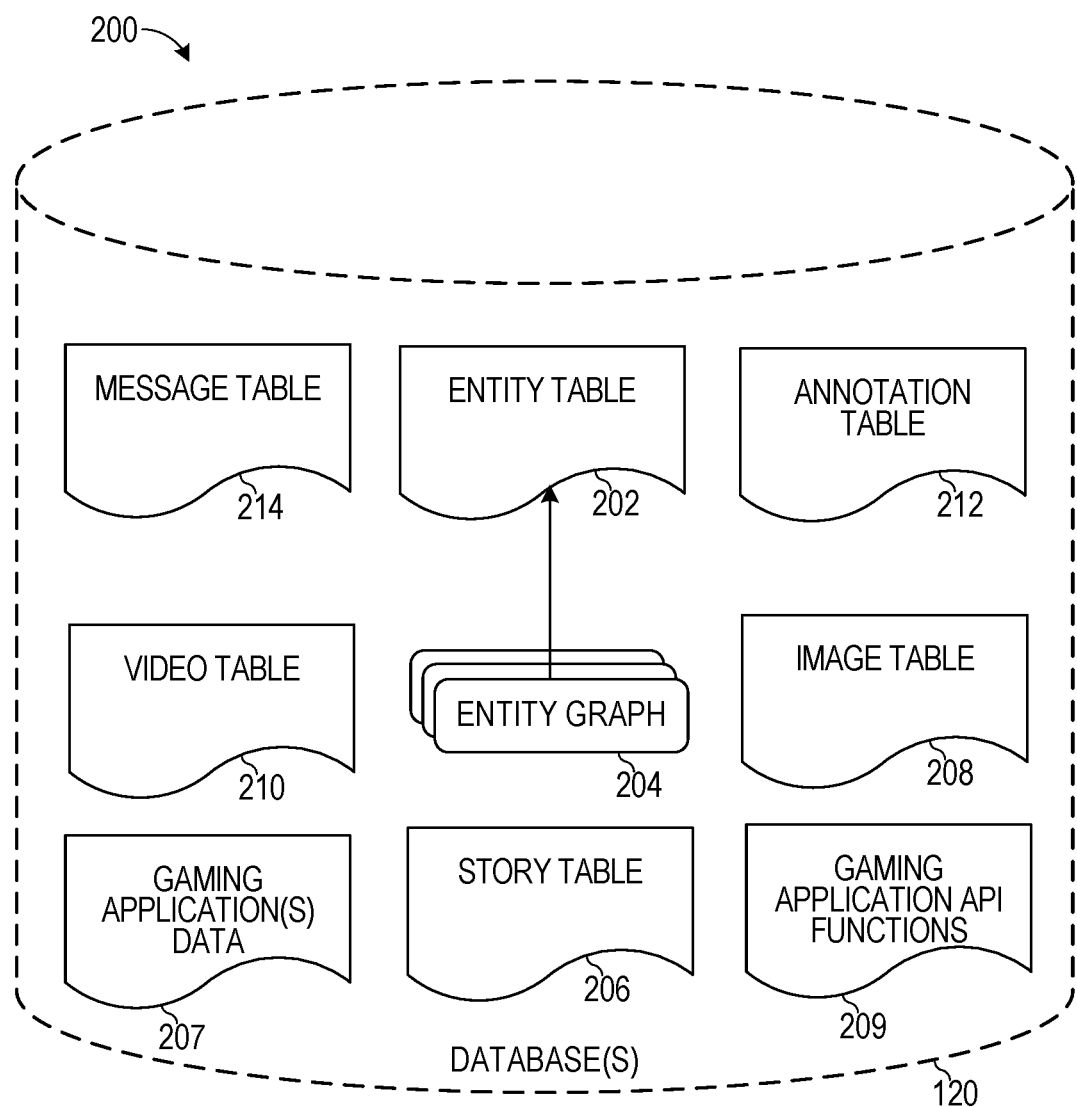
FIG. 2 is a schematic diagram illustrating data which may be stored in the database of a messaging server system, according to example embodiments.

FIG. 2 is a schematic diagram 200 illustrating data, which may be stored in the database 120 of the messaging server system 108, according to certain example embodiments. While the content of the database 120 is shown comprise a number of tables, it will be appreciated that the data could be stored in other types of data structures (e.g., as an object-oriented database).

The database 120 includes message data stored within a message table 214. An entity table 202 stores entity data, including an entity graph 204. Entities for which records are maintained within the entity table 202 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 204 furthermore stores information regarding relationships and associations between entities. Such relationships may be social, professional (e.g., work at a common corporation or organization), interest-based, or activity-based, merely for example.

Message table 214 may store a collection of conversations between a user and one or more friends or entities. Message table 214 may include various attributes of each conversation, such as the list of participants, the size of the conversation (e.g., number of users and/or number of messages), the chat color of the conversation, a unique identifier for the conversation, and any other conversation related feature(s). Information from message table 214 may be provided in limited form and on a limited basis to a given web-based gaming application based on functions of the messaging client application 104 invoked by the web-based gaming application.

The database 120 also stores annotation data, in the example form of filters, in an annotation table 212. Database 120 also stores annotated content received in the annotation table 212. Filters for which data is stored within the annotation table 212 are associated with and applied to videos (for which data is stored in a video table 210) and/or images (for which data is stored in an image table 208). Filters, in one example, are overlays that are displayed as overlaid on an image or video during presentation to a recipient user. Filters may be of various types, including user-selected filters from a gallery of filters presented to a sending user by the messaging client application 104 when the sending user composing a message. Other types of filters include geolocation filters (also known as geo-filters), which may be presented to a sending user based on geographic location. For example, geolocation filters specific to a neighborhood or special location may be presented within a UI by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include current temperature at a specific location, a current speed at which a sending user is traveling, battery life for a client device 102, or the current time.

Other annotation data that may be stored within the image table 208 is so-called "lens" data. A "lens" may be a real-time special effect and sound that may be added to an image or a video.

As mentioned above, the video table 210 stores video data which, in one embodiment, is associated with messages for which records are maintained within the message table 214. Similarly, the image table 208 stores image data associated with messages for which message data is stored in the entity table 202. The entity table 202 may associate various annotations from the annotation table 212 with various images and videos stored in the image table 208 and the video table 210.

Gaming application(s) data 207 stores gaming information associated with one or more web-based gaming application. Such gaming information may include a visual representation (e.g., box art) or icon of the given web-based game. Such a visual representation is used by the messaging application to identify the game and allow the user to select the visual representation to launch the game. The gaming information may include information identifying the maximum number of players a given game can host. This information is used by the messaging application to determine whether a game launched from a given conversation having a certain number of participants can support all of the participants of the conversation. The gaming information may include score information for each game. Such score information can be used by the messaging application to manage and maintain a leaderboard that is specific to each game and/or that is geographically relevant. Namely, the leaderboard can represent leaders of the web-based game among a group of users in a particular geographical location or across the entire list of users of the messaging application. A leader represents a user with a higher score than another user though other attributes can be used to define a leader (e.g., a user who plays a game more time than another user). The gaming information may include a current volume level setting of the gaming application. This may be used by the messaging application to set the volume of the audio of a voice conversation relative to the gaming application volume (e.g., to set the audio of the conversation to be 50% greater than the gaming application volume or set the gaming application volume to 50% less than the volume of the conversation audio).

Gaming application API functions 209 stores a number of functions of the SDK stored on gaming application platform 124. The gaming application API functions 209 stores the code that is executed when a given function of the API is invoked by the web-based gaming application or the messaging client application 104. Such API functions can include:

A function to initialize the web-based gaming application.

A function to set a volume of the web-based gaming application.

A function to provide an authentication token to the web-based gaming application.

A loading progress function, which indicates to the messaging application the loading progress of the web-based game.

A loading complete function, which indicates to the messaging application that loading of the web-based game has completed.

A fetch avatar image function, which is used by the web-based gaming application to obtain an avatar matching a given user(s)' identification.

A play-with-friends function to allow a user to select friends of the user on the messaging application to play with using the look and feel of the messaging application.

Reward video related functions to retrieved advertisements from reward video system 125 and track whether the user completed watching the given advertisements.

A leaderboard function to allow the web-based game to retrieve the leaderboard from gaming application data 207 to present to the user.

A submit-score-to-leaderboard function to allow the web-based game to send to the messaging application score information for a given user to be updated in the leaderboard stored in the gaming application data 207.

An add/remove user function to allow the messaging application to add or remove users from the web-based gaming application.

A focus function to allow the messaging application to inform the web-based gaming application whether the user has lost/regained focus in the game so that the game knows the user is or is not active in the game and whether the user can or cannot interact with the game directly.

A story table 206 stores data regarding collections of messages and associated image, video, or audio data, which are compiled into a collection (e.g., a story or a gallery). The creation of a particular collection may be initiated by a particular user (e.g., each user for which a record is maintained in the entity table 202). A user may create a "personal story" in the form of a collection of content that has been created and sent/broadcast by that user. To this end, the UI of the messaging client application 104 may include an icon that is user-selectable to enable a sending user to add specific content to his or her personal story. The UI of the messaging client application 104 may include selectable options to enable a sending user to add a modified video clip that has a virtual object to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a UI of the messaging client application 104, to contribute content to a particular live story. The live story may be identified to the user by the messaging client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 3:
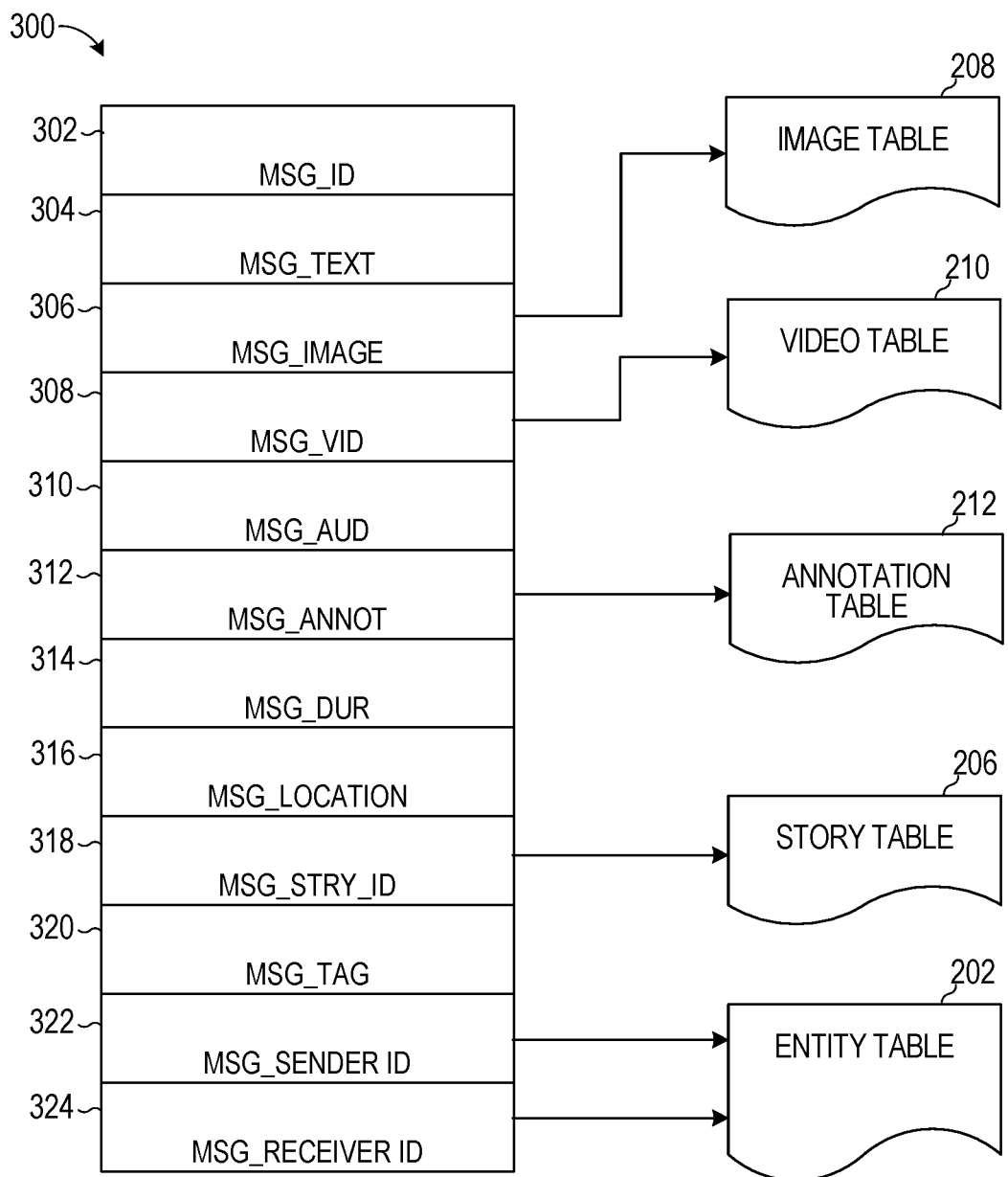
FIG. 3 is a schematic diagram illustrating a structure of a message generated by a messaging client application for communication, according to example embodiments.

FIG. 3 is a schematic diagram illustrating a structure of a message 300, according to some embodiments, generated by a messaging client application 104 for communication to a further messaging client application 104 or the messaging server application 114. The content of a particular message 300 is used to populate the message table 214 stored within the database 120, accessible by the messaging server application 114. Similarly, the content of a message 300 is stored in memory as "in-transit" or "in-flight" data of the client device 102 or the application server 112. The message 300 is shown to include the following components:

A message identifier 302: a unique identifier that identifies the message 300.

A message text payload 304: text, to be generated by a user via a UI of the client device 102 and that is included in the message 300.

A message image payload 306: image data, captured by a camera component of a client device 102 or retrieved from memory of a client device 102, and that is included in the message 300.

A message video payload 308: video data, captured by a camera component or retrieved from a memory component of the client device 102 and that is included in the message 300.

A message audio payload 310: audio data, captured by a microphone or retrieved from the memory component of the client device 102, and that is included in the message 300.

A message annotations 312: annotation data (e.g., filters, stickers, or other enhancements) that represents annotations to be applied to message image payload 306, message video payload 308, or message audio payload 310 of the message 300.

A message duration parameter 314: parameter value indicating, in seconds, the amount of time for which content of the message (e.g., the message image payload 306, message video payload 308, message audio payload 310) is to be presented or made accessible to a user via the messaging client application 104.

A message geolocation parameter 316: geolocation data (e.g., latitudinal and longitudinal coordinates) associated with the content payload of the message. Multiple message geolocation parameter 316 values may be included in the payload, with each of these parameter values being associated with respect to content items included in the content (e.g., a specific image within the message image payload 306, or a specific video in the message video payload 308).

A message story identifier 318: identifier value identifying one or more content collections (e.g., "stories") with which a particular content item in the message image payload 306 of the message 300 is associated. For example, multiple images within the message image payload 306 may each be associated with multiple content collections using identifier values.

A message tag 320: each message 300 may be tagged with multiple tags, each of which is indicative of the subject matter of content included in the message payload. For example, where a particular image included in the message image payload 306 depicts an animal (e.g., a lion), a tag value may be included within the message tag 320 that is indicative of the relevant animal. Tag values may be generated manually, based on user input, or may be automatically generated using, for example, image recognition.

A message sender identifier 322: an identifier (e.g., a messaging system identifier, email address, or device identifier) indicative of a user of the client device 102 on which the message 300 was generated and from which the message 300 was sent.

A message receiver identifier 324: an identifier (e.g., a messaging system identifier, email address, or device identifier) indicative of user(s) of the client device 102 to which the message 300 is addressed. In the case of a conversation between multiple users, the identifier may indicate each user involved in the conversation.

The contents (e.g., values) of the various components of message 300 may be pointers to locations in tables within which content data values are stored. For example, an image value in the message image payload 306 may be a pointer to (or address of) a location within an image table 208. Similarly, values within the message video payload 308 may point to data stored within a video table 210, values stored within the message annotations 312 may point to data stored in an annotation table 212, values stored within the message story identifier 318 may point to data stored in a story table 206, and values stored within the message sender identifier 322 and the message receiver identifier 324 may point to user records stored within an entity table 202.

Figure 4:
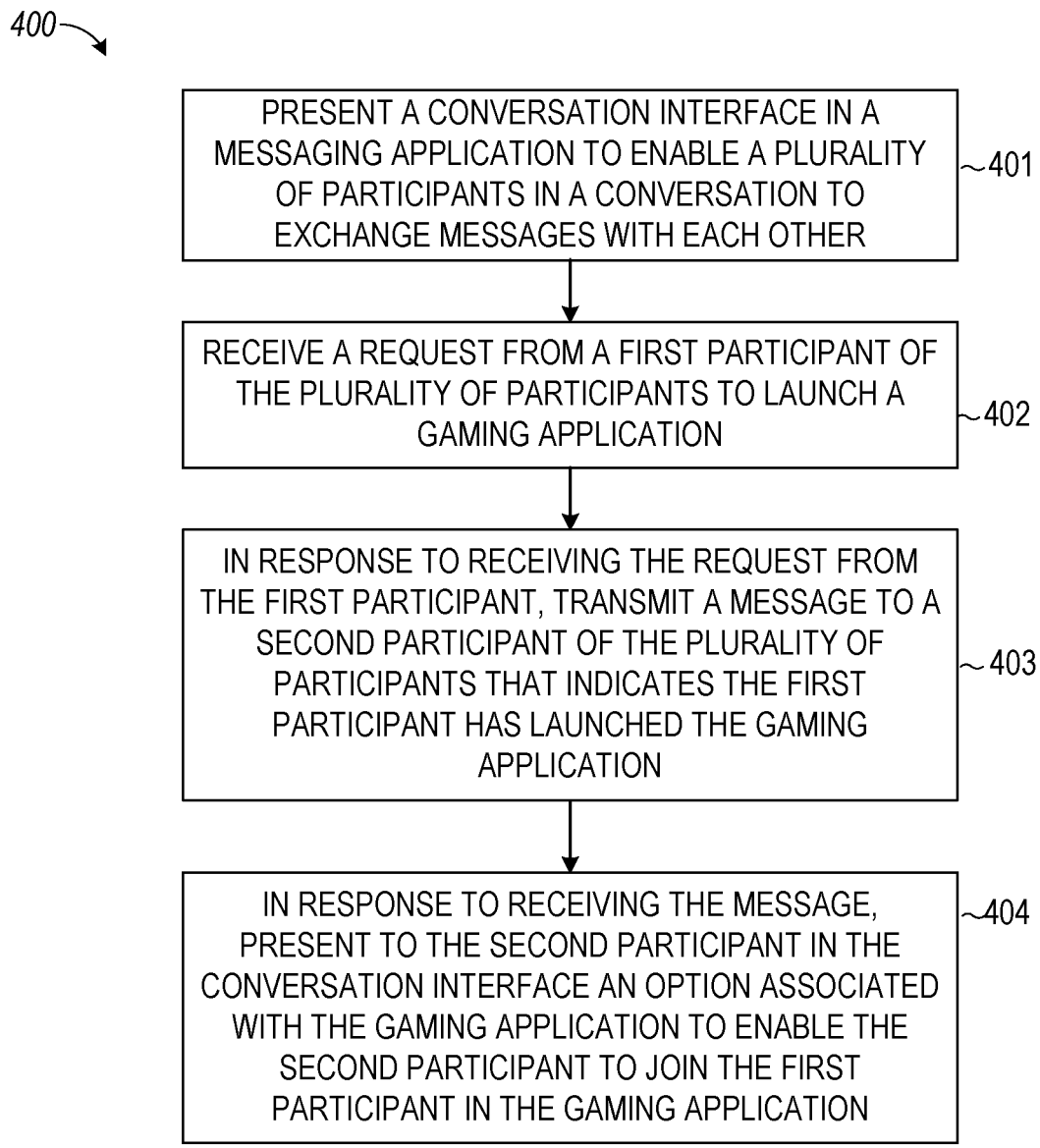
FIGS. 4-5 are flowcharts illustrating example operations of the messaging application, according to example embodiments.
Figure 5:
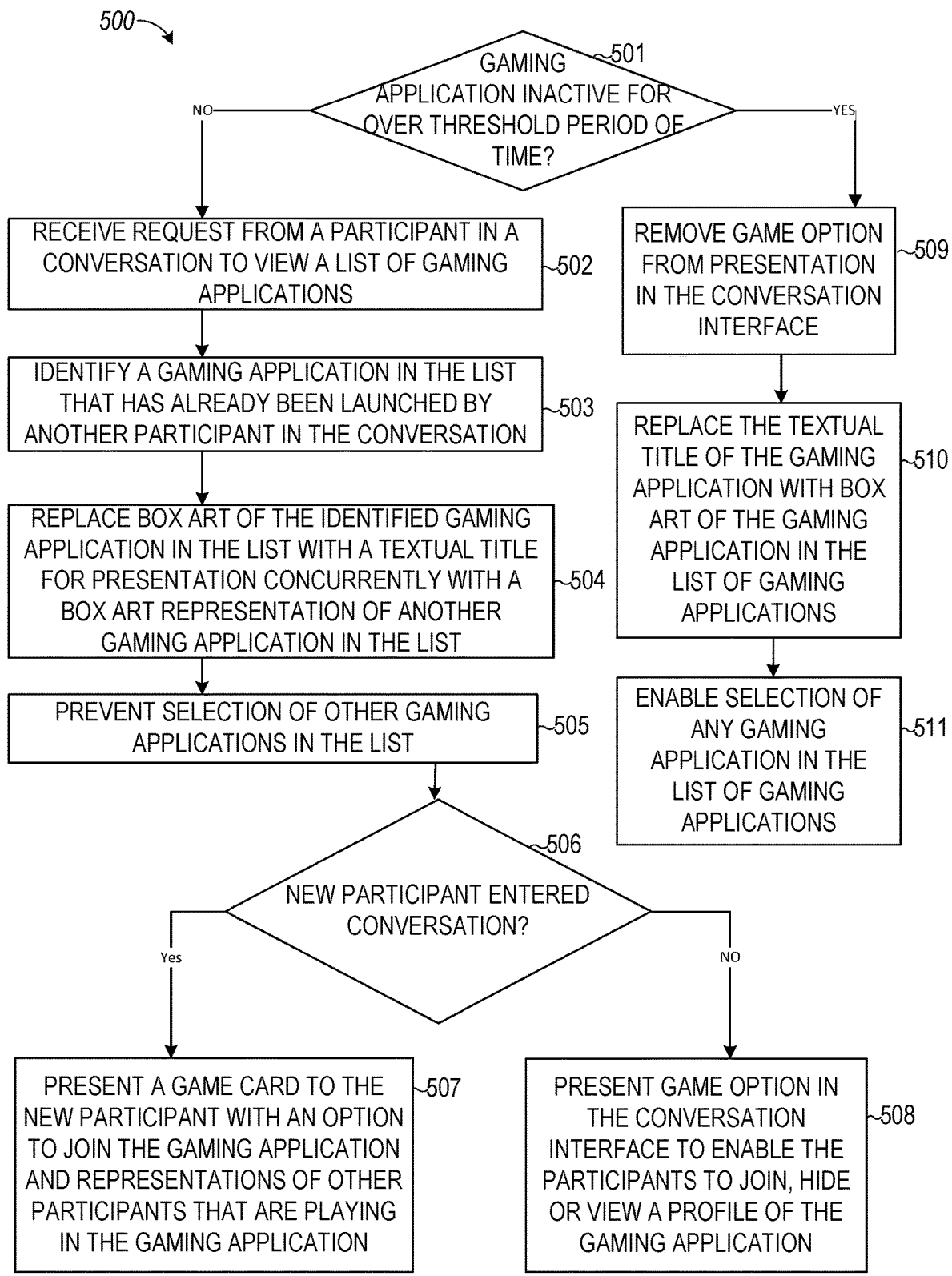

FIGS. 4-5 are flowcharts illustrating example operations of the messaging application in performing processes 400-500, according to example embodiments. The processes 400-500 may be embodied in computer-readable instructions for execution by one or more processors such that the operations of the processes 400-500 may be performed in part or in whole by the functional components of the messaging server system 108; accordingly, the processes 400-500 are described below by way of example with reference thereto. However, in other embodiments at least some of the operations of the processes 400-500 may be deployed on various other hardware configurations. The processes 400-500 are therefore not intended to be limited to the messaging server system 108 and can be implemented in whole, or in part, by any other component.

Process 400 may be performed by the messaging server system 108 to allow users in a conversation to play a gaming application. At operation 401, the messaging application presents a conversation interface to enable a plurality of participants in a conversation to exchange messages with each other. For example, a user of the messaging application may desire to communicate with a number of friends the user is connected to in the messaging application. In one embodiment, the messaging application may present a friends list and the user can select which friends from the friends list the user would like to engage in a conversation. The user can select any number of friends. In response to receiving the user selection of the friends, the messaging application opens a conversation interface for each user selected to be in the conversation. For example, if the user selected 5 friends, the conversation interface may identify all 6 users (e.g., the 5 friends plus the user who formed the group) and may allow the users to exchange messages with each other. In some embodiments, the 6 users may be identified in the conversation interface in a presence region of the conversation interface. The presence region may present avatars or other representations of each participant in the conversation. Specifically, the presence region may present to a first participant in the conversation all the other participants in the conversation (e.g., may include avatars for all of the participants except the first participant). The presence region may present to a second participant in the conversation all the other participants in the conversation (e.g., may include avatars for all of the participants except the second participant).

One way the users can communicate is by sending text, video, or images as messages. Whenever a given user in the conversation sends a message, the message appears in the conversation interface so that all of the 6 users in the conversation can see the message. In some embodiments, a given user is notified when a new message is submitted to the conversation interface so the user can access the conversation interface to see the messages. Messages appear in the conversation interface as chat bubbles and may be in a font associated with each participant. Namely, each participant may be assigned a different font color or style and whenever the participants send messages, their messages appear in the font color or style assigned to the participants. The chat bubbles appear in chronological order such that the oldest messages that were exchanged in the conversation interface are presented at the top and newer messages are presented at the bottom, though any other arrangement of the chat bubbles can be provided.

At operation 402, the messaging application receives a request from a first participant of the plurality of participants to launch a gaming application. For example, one of the many options users have in the conversation interface is the ability to launch a gaming application. To launch a given game, a user selects a game icon (e.g., a rocket icon) that is presented in the conversation interface. In response to receiving the user's selection of the game icon, the messaging application presents a game drawer with one or more gaming applications the user can launch. The game drawer includes visual representations of the games in the form of box arts associated with each game. In response to receiving a user selection of one of the gaming applications listed in the game drawer (e.g., by tapping a given game's box art), the messaging application accesses the HTML5 file of the selected gaming application and instantiates various resources necessary to launch the gaming application. In some embodiments, once a given gaming application is launched, the box art associated with that game is replaced with a game title in textual form and no other game can be selected from the game drawer until the selected game is finished or is hidden (exited) from the conversation. Further details of the format for presenting the list of gaming applications in the game drawer are provided below in connection with FIGS. 8-11.

The gaming application, once launched, invokes an initialize function to communicate with the messaging application to obtain various user and state information. Launching a gaming application directly from the conversation interface allows a given participant in the conversation interface to play the game with the participants of the conversation. In this way, the participant who launched the gaming application can continue the conversation with the same group of participants in the game and also play the game with the same group of participants. To the user, the transition into the game from the conversation seems seamless because the user does not need to leave the conversation to play the game with the user's friends and to communicate with those friends in the game. Some of the functions and functionality of the gaming application interacting with the messaging client application to provide the seamless transition of the conversation are discussed in detail in commonly-owned, commonly-assigned Alexander R. Osborne et al., U.S. patent application Ser. No. 16/177,332, filed Oct. 31, 2018, entitled "IN-GAME STATUS BAR," which is hereby incorporated by reference.

At operation 403, in response to receiving the request from the first participant, the messaging application transmits a message to a second participant of the plurality of participants that indicates the first participant has launched the gaming application. For example, the messaging application may send a notification to each user in the messaging application identifying the participant who launched a given gaming application and that identifies the given gaming application. In some embodiments, this notification is presented at the top of the conversation interface for each participant to view separate from the messages transmitted in the conversation. In some embodiments, the notification is presented as a chat bubble and appears as though it is part of the messages taking place in the conversation. In some embodiments, the message may be transmitted from the account of the participant who launched the gaming application to the accounts of each other participant in the conversation. This way each participant's conversation interface for this conversation can be updated with information indicating a given participant launched the gaming application.

At operation 404, in response to receiving the message, the messaging application presents to the second participant in the conversation interface an option associated with the gaming application to enable the second participant to join the first participant in the gaming application. For example, the messaging application may present an interactive icon associated with the gaming application in the conversation interface. The interactive icon may be presented as part of the chat bubbles, in a notification region of the conversation interface, or in the presence region of the conversation interface (e.g., next to the avatars of the participants). A given participant in the conversation can tap on the interactive icon to join the first participant in the gaming application. Alternatively, a given participant in the conversation can press and hold the interactive icon to view various options associated with the gaming application (e.g., a hide option to terminate and remove the gaming application from the conversation interface, a join option to join the first participant in the gaming application, a cancel option to return to the conversation interface to type messages, and a view gaming application profile to view details associated with the gaming application). The interactive icon may identify (e.g., using avatars) all of the participants that have already joined the gaming application and are playing together and/or may indicate a number representing how many conversation participants have joined together to play the gaming application, and/or a visual representation of the gaming application (e.g., the box art of the gaming application).

Process 500 may be performed by the messaging server system 108 to allow users in a conversation to play a gaming application.

At operation 501, the messaging application determines if the gaming application has been inactive for over a threshold period of time. In response to determining that the gaming application has been inactive for over the threshold period of time, the messaging application proceeds to operation 509, otherwise the messaging application proceeds top operation 502. For example, the messaging application may maintain a data structure identifying when the gaming application was launched by a given participant in a conversation. The data structure may maintain a timer that is reset whenever the messaging application determines that there is at least one participant who has not left the gaming application (e.g., one of the conversation participants is playing the gaming application). In response to determining that the last participant has left the gaming application, the timer may be initiated. When the timer reaches a predetermined value, the messaging application determines that the gaming application has been inactive for over the threshold period of time.

At operation 502, the messaging application receives a request from a participant in a conversation to view a list of gaming applications. For example, as discussed above, a given participant in the conversation can tap a game icon (e.g., a rocket icon) in the conversation interface. In response, the messaging application determines that a request to view a list of gaming applications has been received.

At operation 503, the messaging application identifies a gaming application in the list that has already been launched by another participant in the conversation. For example, the messaging application may analyze data associated with the conversation interface to determine whether any gaming application has previously been launched and is still not inactive. In some implementations, the messaging application may determine if an interactive icon associated with a gaming application is still present in the conversation interface to determine that the gaming application has been launched by another participant. The messaging application may also analyze conversation-related information stored in a data structure to determine various status information of the conversation including whether and which gaming application has previously been launched.

At operation 504, the messaging application replaces box art of the identified gaming application in the list with a textual tile for presentation concurrently with a box art representation of another gaming application in the list.

At operation 505, the messaging application prevents selection of other gaming applications in the list. For example, the game drawer, presented by the gaming application, may become non-interactive when any gaming application in the game drawer has previously been selected and has not been hidden or did not become inactive for more than a threshold period of time. This ensures that only one gaming application is active at a given time in the conversation interface. Namely, the participants in a given conversation can only play one gaming application at a time. In order to launch a different gaming application, all of the participants have to leave the gaming application (e.g., no participant can remain active in the gaming application) and at least one of the participants has to select the option to hide the gaming application (e.g., by pressing and holding the interactive icon associated with the gaming application) or the gaming application has to be inactive for more than a threshold period of time. When at least one of the participants selects the option to hide the gaming application (e.g., by pressing and holding the interactive icon associated with the gaming application) or the gaming application is inactive for more than a threshold period of time, the interactive icon associated with the gaming application is removed from being presented in the conversation interface and the gaming applications listed in the game drawer return to an interactive state to allow the user to select to launch a given gaming application.

At operation 506, the messaging application determines if a new participant entered the conversation. In response to determining that a new participant entered the conversation, the messaging application proceeds to operation 507, otherwise the messaging application proceeds to operation 508. For example, a given one of the participants (e.g., an administrator or any participant) in the conversation can select an invite option in the conversation interface. In response to receiving the selection of the invite option, the messaging application presents a friend selection interface to the user who selected the invite option. The friend selection interface can be used to allow the user to select one or more other or additional friends to join the conversation. In response to receiving the selection of the friends to join the conversation, the messaging application sends a message to each identified friend with an option to join the conversation interface. If the recipient decides to join the conversation, the messaging application adds the recipient as a new participant to the conversation interface to join all the previous participants. The messaging application updates the presence indicator to include a visual representation of the new participant.

At operation 507, the messaging application presents a game card to the new participant with an option to join the gaming application and representations of other participants that are playing in the gaming application. For example, the messaging application, after the recipient chooses to join the conversation, determines that a gaming application is active or was previously launched in the conversation interface by one of the previous participants. In response to determining that there is an active gaming application or that the gaming application was previously launched, the messaging application presents a game card to the new participant. The game card may visually represent the gaming application with box art, visually represent the participants who joined and are playing the gaming application (e.g., avatars or names of each participant who is playing the gaming application), an option to join the gaming application, an option to view details of the gaming application, and an option to dismiss or join later. The number of participants presented in the game card as playing the gaming application may be less than all of the participants in the conversation. Particularly, if the conversation has 6 participants and only 3 have selected the option to join the gaming application, only avatars or representations of the 3 participants are presented to the new participant in the game card.

At operation 508, the messaging application presents a game option in the conversation interface to enable the participants to join, hide, or view a profile of the gaming application. For example, the messaging application presents an interactive icon associated with the gaming application next to, above, or below the presence region identifying the participants in the conversation interface.

At operation 509, the messaging application removes a game option from presentation in the conversation interface. For example, the messaging application removes the interactive icon associated with the gaming application from being presented next to, above, or below the presence region identifying the participants in the conversation interface or from being presented anywhere on the conversation interface.

At operation 510, the messaging application replaces the textual title of the gaming application with box art of the gaming application in the list of gaming applications.

At operation 511, the messaging application enables selection of any gaming application in the list of gaming applications. For example, as discussed above, the game drawer returns to an interactive state from the non-interactive state to enable any one of the gaming applications listed in the game drawer to be selected and to be launched by a given conversation participant.

Figure 6:
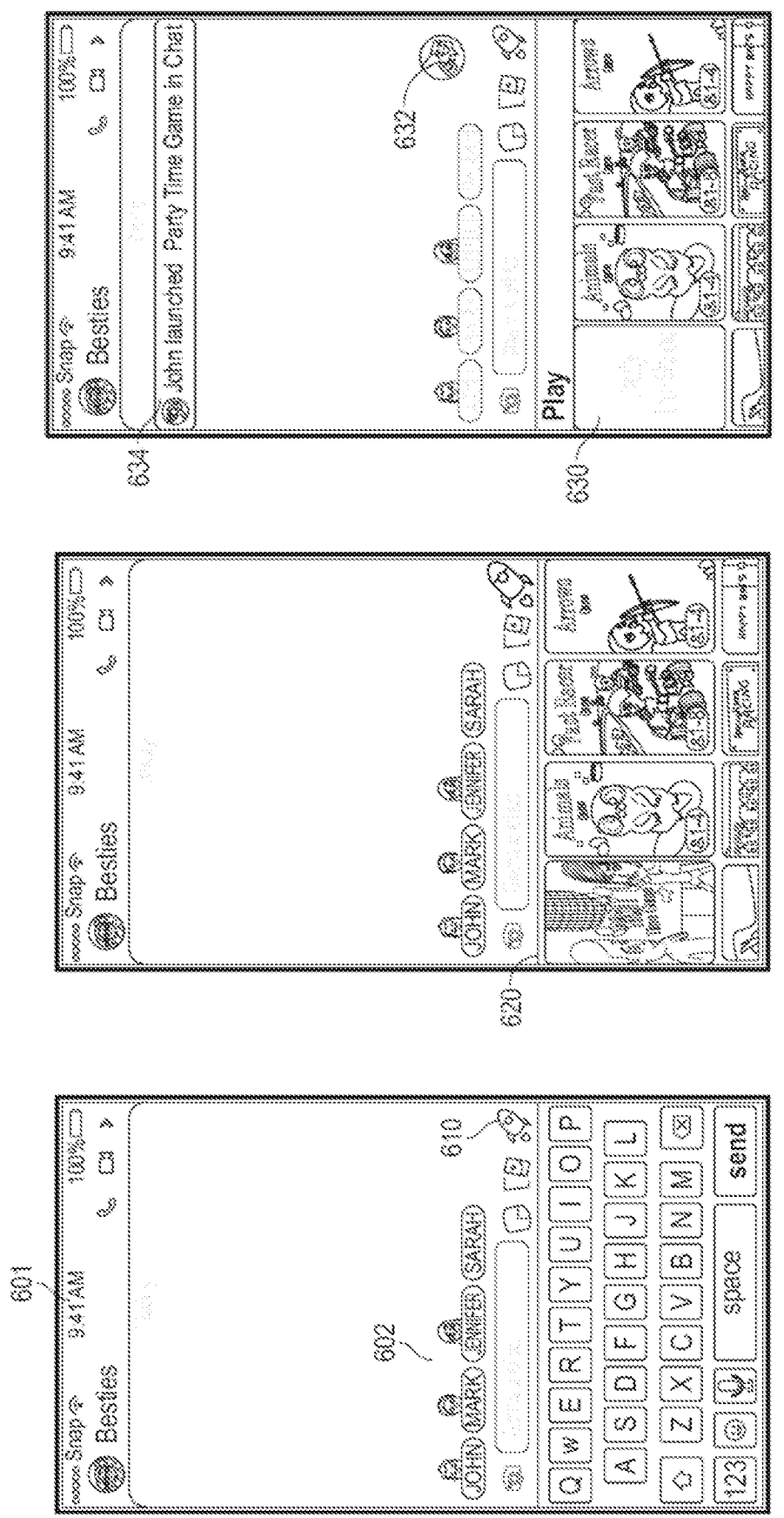
FIGS. 6-7 are illustrative user interfaces of the messaging application, according to example embodiments.

FIG. 6 shows illustrative user interfaces of the messaging application according to some embodiments. For example, the user interfaces of the messaging application shown in FIG. 6 represent a conversation interface 601 between five participants that are part of a group name "Besties." Conversation interface 601 includes a presence region 602 that presents visual identifiers of participants in the group conversation. The visual identifiers in presence region 602 include an avatar associated with each participant and a name of each participant. Underneath the presence region 602 the messaging application presents a plurality of conversation options and a keyboard. The conversation options include a textual entry box in which a participant can type a message using the keyboard and the message is presented as a chat bubble above the presence region 602. Other conversation options include a camera option allowing a user to take a picture or video for submission to the conversation interface as a message in a chat bubble.

Conversation interface 601 also includes a game icon 610 (e.g., a rocket icon). In response to receiving a user selection of a game icon 610, the messaging application replaces the display of the keyboard with a display of a game drawer 620. The game drawer 620 includes one or more representations (e.g., box arts) of one or more associated gaming applications. As discussed above, when none of the gaming applications is active in the conversation, the representations in the game drawer 620 are interactive, allowing a user to select a given representation to launch the corresponding gaming application. When at least one of the gaming application is active or has been launched and is in the conversation interface, the representations in the game drawer 620 are non-interactive to prevent additional gaming applications from being launched while another gaming application is active.

In response to receiving a user selection of one of the visual representations, the messaging application retrieves the HTML5 file of the gaming application associated with the selected visual representation and instantiates various resources to launch the gaming application. The messaging application animates the selected visual representation as moving from the position in the game drawer 620 into the conversation interface (e.g., into the presence region 602). In other implementations, the selected visual representation can be animated as moving from the position in the game drawer 620 into any other place in the conversation interface (e.g., into the chat bubble region). The animation may include removing the box art and floating the box art from the position in the game drawer 620 across the screen to a position in the presence region 602. Once the visual representation reaches the specified position on the screen (e.g., the presence region 602), the visual representation is replaced with an interactive icon 632 associated with the gaming application. This interactive icon 632 is presented to all of the participants in the conversation when any participant in the conversation launches a given gaming application. Namely, if Jennifer launches a given gaming application, once the visual representation of the gaming application reaches the position on the screen, the interactive icon 632 is presented to Jennifer and to all of the other participants (e.g., Mark and John) in the presence region 602 of each respective participant. The interactive icon 632 can be selected or tapped by another participant to automatically join the gaming application with the other participants who are already in the gaming application. In some implementations, the interactive icon 632 presented in the conversation interface of the participant who initially selected and launched the gaming application from the game drawer 620 may look different from the interactive icon 632 presented to other participants in the conversation interface. For example, interactive icon 710 (FIG. 7) may be presented in the conversation interface to another participant who did not initially launch the gaming application. Icon 710 may look different from icon 632.

Once the gaming application is launched, the messaging application replaces the visual representation associated with the gaming application in the game drawer 620 with an alternate visual representation. For example, the messaging application replaces the box art of the selected game in the game drawer 620 with just a textual title 630 of the gaming application. Box art of other gaming applications in the game drawer 620 that were not launched remain the same. In this way, the launched gaming application is represented in the game drawer 620 with just a title while non-launched gaming applications in the game drawer 620 remain represented by their respective box arts. When any of the gaming applications is launched, the gaming applications in game drawer 620 become non-interactive to prevent users from being able to select and launch more than one gaming application in the conversation interface.

The game drawer 620 is the same no matter which participant in the conversation it is being presented to. Namely, one user's interactions with the game drawer 620 affect the way another user in the same conversation sees the game drawer 620. Specifically, when Jennifer selects a given game in the gaming application causing its visual representation to change from box art to simple textual title, Mark will also see the game drawer 620 in which the visual representation of the gaming application is a simple textual title. Also, the game drawer 620 presented to Mark will also be non-interactive when Jennifer launches a given one of the gaming applications listed in the game drawer 620. During a time when none of the gaming applications have been launched in the conversation interface, both Mark and Jennifer will see a game drawer 620 that is interactive and where each game is represented by box art of the game. Once Jennifer selects and launches one of the games in the game drawer 620, the game drawer switches to a non-interactive state, disallowing Jennifer from selecting additional gaming applications to launch. When Mark requests to view the game drawer 620 (e.g., by selecting game icon 610), the game drawer 620 will be presented to Mark, will be non-interactive, and will have the game that has been launched in the conversation presented with just a textual title instead of the box art. This prevents Mark from launching any other game when another participant (e.g., Jennifer) in the conversation already launched a given gaming application.

Once the gaming application is launched, the messaging application presents a message 634 to the participants in the conversation. The message 634 specifies which participant launched a given gaming application and the name of the gaming application that has been launched. The message 634 may be presented anywhere in the conversation interface including as a chat bubble, at a dedicated status region of the screen, or next to or as part of presence region 602.

Figure 7:
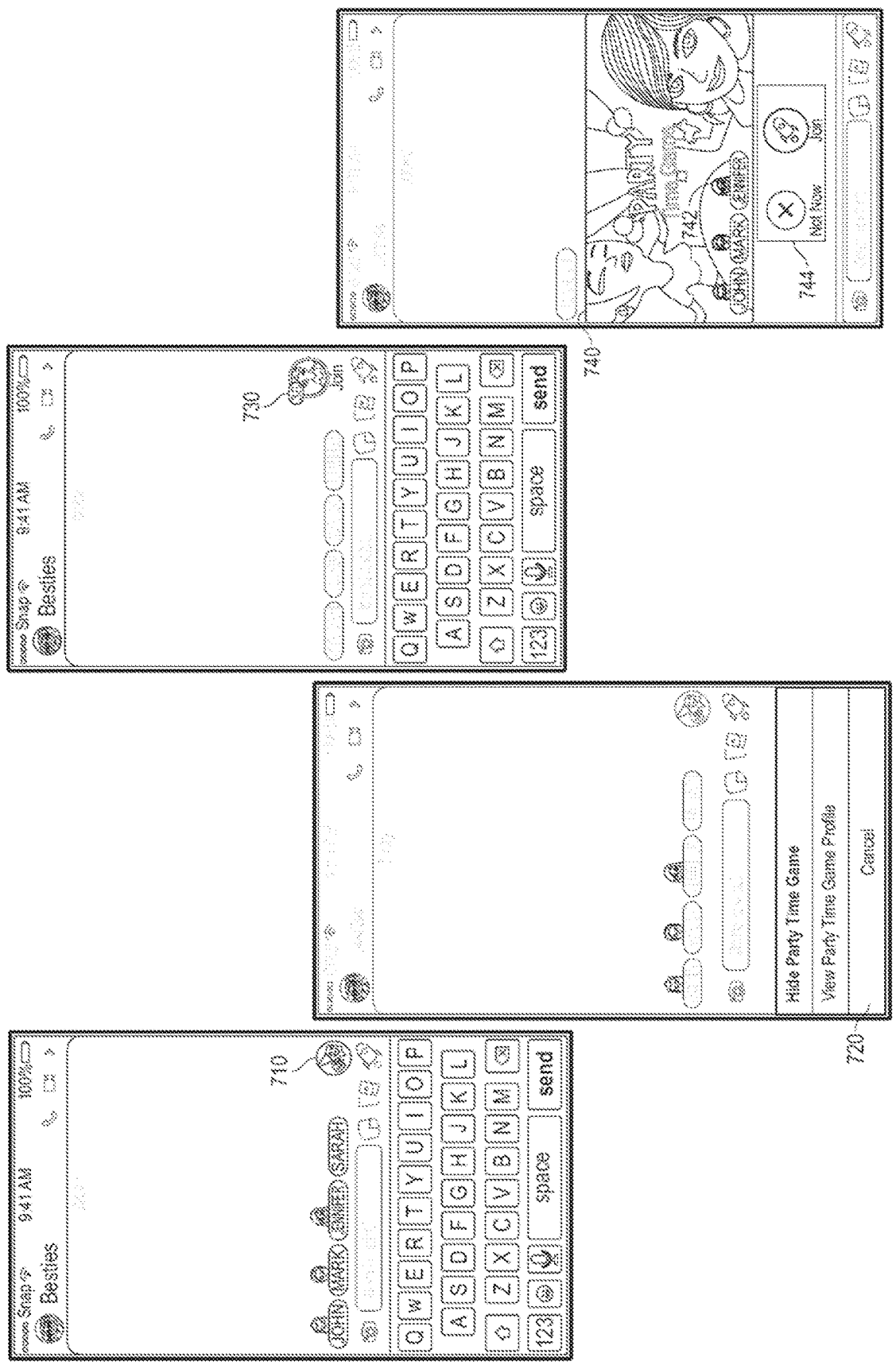

FIG. 7 shows illustrative user interfaces of the messaging application according to some embodiments. A given participant in the conversation interface may tap interactive icon 710 to automatically join the other players in the gaming application (e.g., to join other conversation participants who are already playing in the gaming application). In response to receiving a tap of icon 710 from a given participant in the conversation, the messaging application may communicate with the gaming application and instruct the gaming application to add the given participant to the game. The messaging application may retrieve the user ID and avatar information of the participant who tapped icon 710 and provide that information in a message via platform 124 to the gaming application.

The messaging application may detect that a given participant in the conversation presses and holds icon 710 for more than a threshold period of time (e.g., more than 2 seconds). In response, the messaging application presents a set of options 720 associated with the gaming application to the participant from whom the press and hold action was received. For example, the messaging application may present in the set of options 720, a hide gaming application option and a view profile of gaming application option. In response to receiving a user selection of the hide gaming application option (e.g., if the user taps the option), the messaging application may exit the gaming application (terminate the gaming application) and remove the icon 710 from being presented in the conversation interface. In certain embodiments, the messaging application may communicate with the gaming application via platform 124 to determine if any participants are still active in the gaming application. The messaging application may only make the hide gaming application option interactive or available for selection if none of the participants are currently active in the gaming application. Once the hide gaming application option is selected, the gaming application box art may be presented again in the game drawer 620, making the game drawer 620 switch to an interactive state from a non-interactive state. This allows any of the participants to select another gaming application from the game drawer 620 to launch.

In response to receiving a user selection of the view profile of the gaming application option, the messaging application may obtain information associated with the gaming application and present the information to the user. For example, the messaging application may present a detailed description of the gaming application, a box art of the gaming application, an indication of the conversation participants that are active and playing in the gaming application, and any other suitable information. The messaging application may also include options to join the game and/or hide the gaming application.

In some embodiments, interactive icon 710 may include visual representations of participants who already joined and are playing the gaming application. Interactive icon 710 may identify the number of participants who are playing the gaming application. For example, interactive icon 710 may present avatars of one or more participants in the gaming application and a number indicating how many participants are playing in the gaming application. In some embodiments, instead of or in addition to presenting avatars of participants who are already playing in the gaming application, the interactive icon 710 may present an avatar of the user who is viewing the conversation interface with a join indicator. For example, if Jennifer received the invitation in the conversation interface to join Mark in the gaming application, the interactive icon 710 presented to Jennifer may include an avatar for Jennifer with an indication to join. If Jennifer taps the interactive icon 710, Jennifer will automatically be joined with Markin playing the gaming application. In this way every user sees the interactive icon 710 in a different manner that is specific to that user (e.g., with the user's own avatar). Once Jennifer joins Mark in the gaming application, the number of active participants playing the gaming application indicated by interactive icon 710 that is presented to other participants in the conversation who have not yet joined the gaming application will be updated to reflect the fact that Jennifer joined.

In some embodiments, the messaging application detects that a new participant has been added or has joined the conversation. For example, the messaging application detects that Sarah has joined the Besties conversation group. The messaging application determines if a gaming application is currently active in the conversation with these participants. In response to determining that the gaming application is active, the messaging application presents a game card 740 to the new participant of the conversation. The game card 740 may include box art of the gaming application, a visual representation 742 of each participant in the conversation who is currently active in the gaming application (e.g., the visual representation 742 may represent less than all of the participants of the conversation as it only identifies those participants who joined the gaming application), and options 744 associated with the gaming application. Visual representation 742 may include avatars of each participant and/or names of the participants. Options 744 may include a join option and a not now option. In response to receiving a selection from the new participant of the join option presented in options 744, the messaging application communicates via platform 124 with the gaming application and provides the identity of the new participant to the gaming application. In this way, the new participant is joined in the gaming application with the other participants who are identified by visual representation 742. In response to receiving a selection of the dismiss option in options 744, or if the messaging application detects that the user tapped outside of the game card 740, the messaging application presents the conversation interface with the keyboard and the presence region 602 to the new participant. Presence region 602 includes the interactive icon 710 to allow the new participant to tap icon 710 to join the gaming application or press and hold icon 710 to view the set of options 720.

Figure 8:
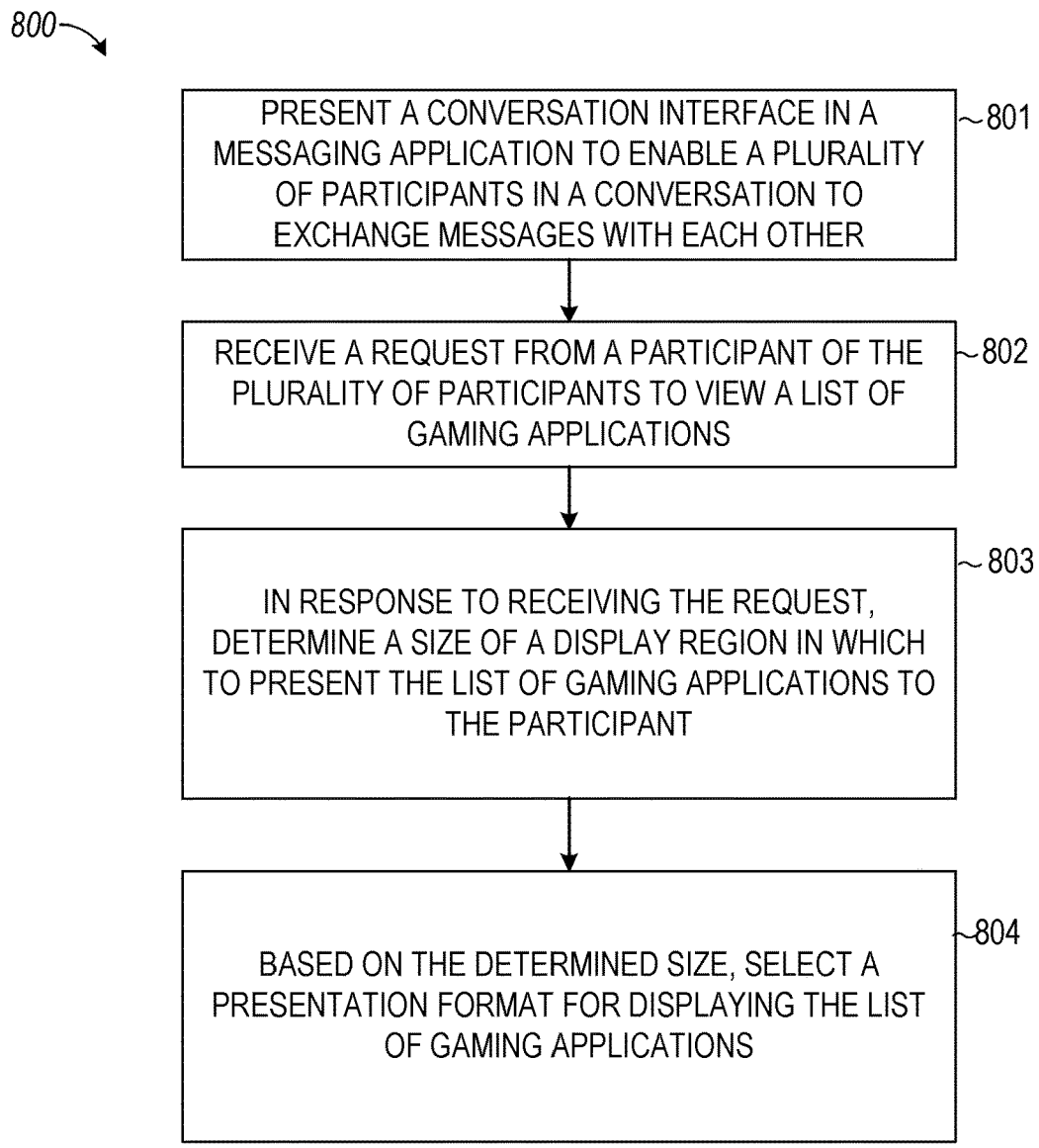
FIG. 8 is a flowchart illustrating example operations of the messaging application presenting a list of gaming applications, according to example embodiments.

FIG. 8 is a flowchart illustrating example operations of the messaging application in performing process 800 to present a game drawer in a conversation interface, according to example embodiments. The process 800 may be embodied in computer-readable instructions for execution by one or more processors such that the operations of the process 800 may be performed in part or in whole by the functional components of the messaging server system 108; accordingly, the process 800 is described below by way of example with reference thereto. However, in other embodiments, at least some of the operations of the process 800 may be deployed on various other hardware configurations. The process 800 is therefore not intended to be limited to the messaging server system 108 and can be implemented in whole, or in part, by any other component.

At operation 801, a conversation interface is presented in a messaging application to enable a plurality of participants in a conversation to exchange messages with each other. For example, a user of the messaging application may desire to communicate with a number of friends the user is connected to in the messaging application. In one embodiment, the messaging application may present a friends list and the user can select which friends from the friends list the user would like to engage in a conversation. The user can select any number of friends. In response to receiving the user selection of the friends, the messaging application opens a conversation interface for each user selected to be in the conversation. For example, if the user selected 5 friends, the conversation interface may identify all 6 users (e.g., the 5 friends plus the user who formed the group) and may allow the users to exchange messages with each other. In some embodiments, the 6 users may be identified in the conversation interface in a presence region of the conversation interface. The presence region may present avatars or other representations of each participant in the conversation. Specifically, the presence region may present to a first participant in the conversation all the other participants in the conversation (e.g., may include avatars for all of the participants except the first participant). The presence region may present to a second participant in the conversation all the other participants in the conversation (e.g., may include avatars for all of the participants except the second participant). Exemplary conversation interfaces are shown and described in connection with FIGS. 6-7 and 10-11.

At operation 802, a request from a participant of the plurality of participants to view a list of gaming applications is received by the messaging application. For example, a user selects a game icon 610 (e.g., a rocket icon) (FIG. 6) that is presented in the conversation interface. In response to receiving the user's selection of the game icon 610, the messaging application presents a game drawer with one or more gaming applications the user can launch. The game drawer includes visual representations of the games in the form of box art associated with each game. In response to receiving a user selection of one of the gaming applications listed in the game drawer (e.g., by tapping a given game's box art), the messaging application accesses the HTML5 file of the selected gaming application and instantiates various resources necessary to launch the gaming application. Exemplary interfaces of the game drawer presented in response to receiving a user selection of game icon 610 are shown and described in connection with FIGS. 9 and 10 below.

At operation 803, in response to receiving the request to view the list of gaming applications, the messaging application determines a size of a display region in which to present the list of gaming applications to the participant. For example, the messaging application may identify an area of the display in which a keyboard is presented in the conversation interface. The messaging application may determine the aspect ratio and size of the keyboard as the size of the display region in which to present the list of gaming applications. Specifically, in response to receiving the user request to view the list of gaming applications, the messaging application may replace a display of the keyboard with the display of the list of gaming applications. As such, the messaging application determines the size of the keyboard display area and bases the format for presenting the list of gaming applications on the size of the display area.

In certain embodiments, the size of the display area may be determined based on the type of user device being used to present the conversation interface. For example, a first type of user device may correspond to a "normal" user device having a display screen with a first size, and a second type of user device may correspond to a "tall" user device having a larger display screen with a second size. In certain embodiments, the size of the display area in which the game drawer is to be presented (e.g., in place of the on-screen keyboard) may be a function of a height-to-width ratio for the given device type. In particular, different device types may have different height-to-width ratios for presenting the game drawer. While the height of the game drawer is consistent and the same for every device type, the width of the game drawer may vary from one device type to another. As an example, a normal user device may have a height-to-width ratio for the game drawer display area that is less than or equal to 256/375, while a tall user device may have a height-to-width ratio for the game drawer display area that is greater than 256/375.

At operation 804, the messaging application selects a presentation format for displaying the list of gaming applications based on the determined size of the display area for displaying the game drawer. For example, the messaging application may select how many gaming application representations to present in each row of the game drawer and the aspect ratio of each gaming application representation that is presented. The selection may depend on the height-to-width ratio of the game drawer display area.

A user interface in which a conversation interface is presented in a messaging application, a request from a participant to view a list of gaming applications is received, a size of a display region in which to present the list of gaming applications to the participant is determined, and a presentation format for displaying the list of gaming applications is selected based on the determined size significantly improves the user experience, reduces the amount of whitespace on the screen, reduces the number of steps a user has to perform to select and launch a game, and makes playing the games more enjoyable. This is because the user can find gaming applications to play with their friends and easily launch and join their friends in playing these games without actually searching for and opening up different interfaces to find a game to play and then having to find friends within the gaming interface to play with. Rather than paging through multiple screens of gaming applications and menus to find friends to play with, only a few steps may be needed from a conversation interface to reach and launch a select gaming application.

Figure 9:
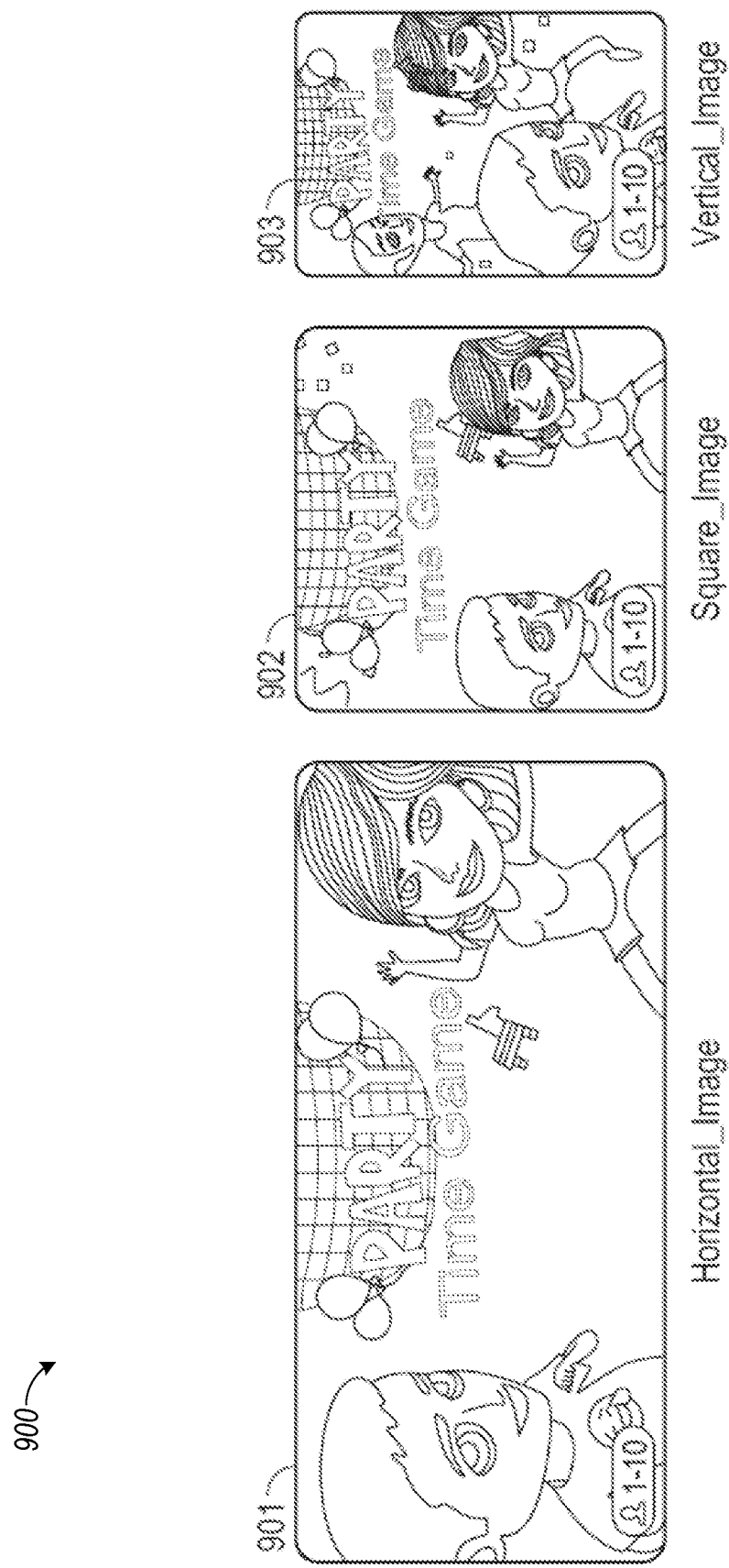
FIG. 9 is an illustrative gaming application representation stored by the messaging application, according to example embodiments.

Specifically, the messaging application may store a plurality of gaming application representations for each gaming application that is listed in the game drawer. Each gaming application representation may have a different aspect ratio. For example, FIG. 9 shows three illustrative gaming application representations 900 that are stored for a particular gaming application (e.g., as part of gaming application data 207). Each gaming application representation 900 includes a box art for the same gaming application with different aspect ratios. Specifically, a horizontal_image 901 (e.g., horizontal representation) may be a first gaming application representation stored in gaming application data 207 for the given gaming application, a square_image 902 (e.g., square representation) may be a second gaming application representation stored in gaming application data 207 for the given gaming application, and a vertical_image 903 (e.g., vertical representation) may be a third gaming application representation stored in gaming application data 207 for the given gaming application. The horizontal_image 901 representation may have an aspect ratio in which the width is greater than the height of the representation. The square_image 902 representation may have an aspect ratio in which the width is equal to the height of the representation. The vertical_image 901 representation may have an aspect ratio in which the width is smaller than the height of the representation. Table 1 below includes exemplary aspect ratios of each the representations: horizontal_image 901, square_image 902, vertical_image 901:

TABLE 1

Box Art aspect ratios for a given gaming application representation

| Gaming Application Representation | Height/Width Aspect Ratio |
|---|---|
| Horizontal | 730/408 |
| Square | 1 |
| Vertical | 16/9 |

The messaging application determines the size of the available screen area in which the list of gaming applications are presented in the game drawer and selects a type of gaming application representation (e.g., horizontal, square, or vertical) to use to represent each gaming application in the displayed game drawer. The messaging application also determines how many of each gaming application representation to include in each row of the game drawer based on the determined size of the available screen area. In this way, the messaging application is able to generate for presentation a game drawer that includes as many representations of the gaming applications as possible without sacrificing visual aspects of the box art while also minimizing the amount of whitespace consumed by the game drawer. In certain embodiments, the messaging application includes no more than four gaming application representations per row.

Table 2 below includes exemplary display formats for presenting the game drawer based on the size of the available screen area determined based on the device type (e.g., normal or tall device) and based on the number of gaming applications included in the list of gaming applications:

TABLE 2

Format of Game Drawer Display Based on Device Type and Number of Games

| Device Type | Number of Gaming Applications in the List | Type of Representation | Number of Representations Per Row |
|---|---|---|---|
| Normal | 1 | Horizontal | 1 |
| Normal | 2 | Square | 2 |
| Normal | 3 | Vertical | 3 |
| Normal | 4-7 | Horizontal | 2 |
| Normal | 8 or more | Vertical | 4 |
| Tall | 1 | Square | 1 |
| Tall | 2-3 | Horizontal | 1 |
| Tall | 4-5 | Square | 2 |
| Tall | 6 or more | Vertical | 3 |

Figure 10:
FIGS. 10 and 11 are illustrative user interfaces of the messaging application presenting a list of gaming applications, according to example embodiments.

FIG. 10 shows exemplary display formats of the game drawer display for a normal device (e.g., a device type in which the display area of the game drawer has a height-to-width ratio being less than or equal to 256/375). As an example, the messaging application may determine that the participant is using a normal device and receives a selection from the participant of the game icon 610. In response, the messaging application may determine how many gaming applications are included in the gaming applications list. In response to determining that only one game is included in the gaming applications list, the messaging application, based on table 2, which may be stored in gaming application data 207, generates a presentation format for the game drawer in which a horizontal representation is included in the game drawer. Specifically, the messaging application may retrieve from gaming application data 207 the horizontal_image 901 of the gaming application and generate an interface 1010 that includes the retrieved representation of the gaming application.

In response to determining that two games are included in the gaming applications list, the messaging application, based on table 2, which may be stored in gaming application data 207, generates a presentation format for the game drawer in which two square representations are included for each row in the game drawer. Specifically, the messaging application may retrieve from gaming application data 207 the square_image 902 of each gaming application in the list and generate an interface 1020 that includes the two retrieved representations of the gaming applications in the same row. In response to determining that three games or more than eight games are included in the gaming applications list, the messaging application, based on table 2, which may be stored in gaming application data 207, generates a presentation format for the game drawer in which a vertical representation is included in the game drawer for each game and in which three representations are included in each row. Specifically, the messaging application may retrieve from gaming application data 207 the vertical_image 903 of the gaming applications in the list and generate an interface 1030 that includes three retrieved representations of the gaming applications per each row. In certain scenarios, when more than 8 games are included in the list, the messaging application may generate a presentation format that includes four representations per each row instead of three representations per each row.

In response to determining that 4-7 games are included in the gaming applications list, the messaging application, based on table 2, which may be stored in gaming application data 207, generates a presentation format for the game drawer in which two horizontal representations are included for each row in the game drawer for each game. Specifically, the messaging application may retrieve from gaming application data 207 the horizontal_image 901 of the gaming applications in the list and generate an interface 1040 that includes two of the retrieved representations of the gaming applications per each displayed row.

In certain scenarios, the messaging application may shrink or reduce the retrieved images of each gaming application to fit the retrieved images into the available screen space in the game drawer. For example, when only one game is included in the list, the messaging application retrieves and presents the horizontal image 901 associated with that game in its original size. However, when 4-7 games are included in the list, the messaging application may determine a need to include two representations in a given row and accordingly reduces a size of each retrieved horizontal image 901 so as to fit in the available screen space for the drawer.

Figure 11:
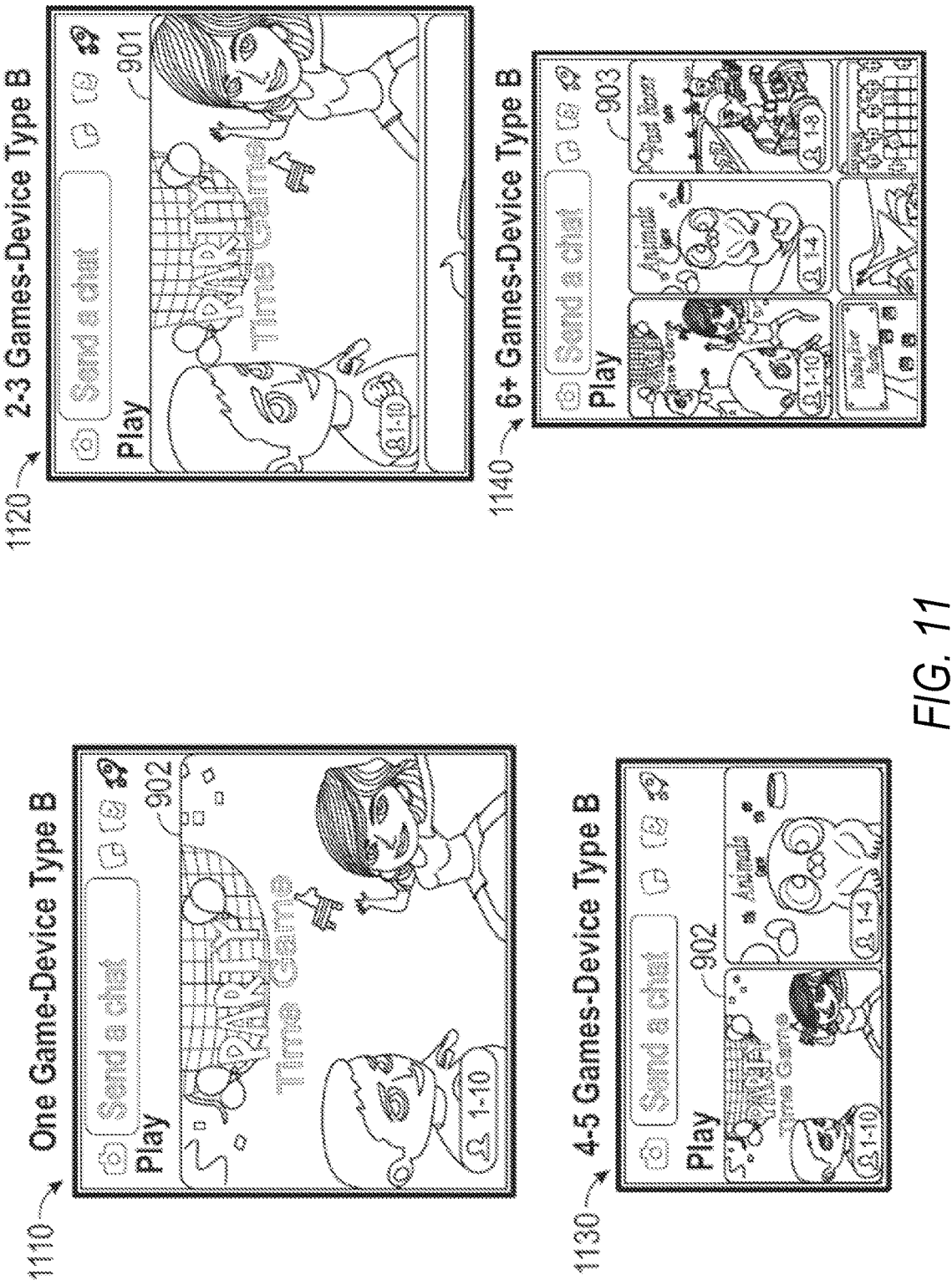

FIG. 11 shows exemplary display formats of the game drawer display for a tall device (e.g., a device type in which the display area of the game drawer has a height to width ratio being greater than 256/375). As an example, the messaging application may determine that a different participant is using a tall device and receives a selection from that participant of the game icon 610. In response, the messaging application may determine how many gaming applications are included in the gaming applications list. In response to determining that only one game is included in the gaming applications list, the messaging application, based on table 2, which may be stored in gaming application data 207, generates a presentation format for the game drawer in which a square representation is included in the game drawer. Specifically, the messaging application may retrieve from gaming application data 207 the square_image 902 of the gaming application and generate an interface 1110 that includes the retrieved representation of the gaming application.

In response to determining that 2-3 games are included in the gaming applications list, the messaging application, based on table 2, which may be stored in gaming application data 207, generates a presentation format for the game drawer in which one horizontal representation is included for each row in the game drawer. Specifically, the messaging application may retrieve from gaming application data 207 the horizontal_image 901 of each gaming application in the list and generate an interface 1120 that includes each retrieved representation of the gaming application per each row. To view additional representations in interface 1120, a user can swipe vertically to scroll the game drawer up/down to reveal additional gaming application representations.

In response to determining that 4-5 games are included in the gaming applications list, the messaging application, based on table 2, which may be stored in gaming application data 207, generates a presentation format for the game drawer in which a square representation is included in the game drawer for each game and in which two representations are included in each row. Specifically, the messaging application may retrieve from gaming application data 207 the square_image 902 of the gaming applications in the list and generate an interface 1130 that includes two retrieved representations of the gaming applications per each row.

In response to determining that more than six games are included in the gaming applications list, the messaging application, based on table 2, which may be stored in gaming application data 207, generates a presentation format for the game drawer in which three vertical representations are included for each row in the game drawer for each game. Specifically, the messaging application may retrieve from gaming application data 207 the vertical_image 903 of each gaming application in the list and generate an interface 1140 that includes three of the retrieved representations of the gaming applications per each displayed row.

When multiple games are included in the list, the messaging application may determine a presentation order in which to present the representations of each gaming application. For example, the messaging application may present the representations in the game drawer in alphabetical order or each game's title. In this way, gaming applications having titles that come earlier in the alphabet than other gaming applications will be listed earlier or at the top of the gaming application list. In other embodiments, the messaging application may present the representations in an order determined based on popularity of the gaming applications such that more popular gaming applications have representations presented earlier in the presentation format than others. In other embodiments, the messaging application may present the representations in an order determined based on frequency of use of the gaming applications such that more frequently used gaming applications have representations presented earlier in the presentation format than others.

Figure 12:
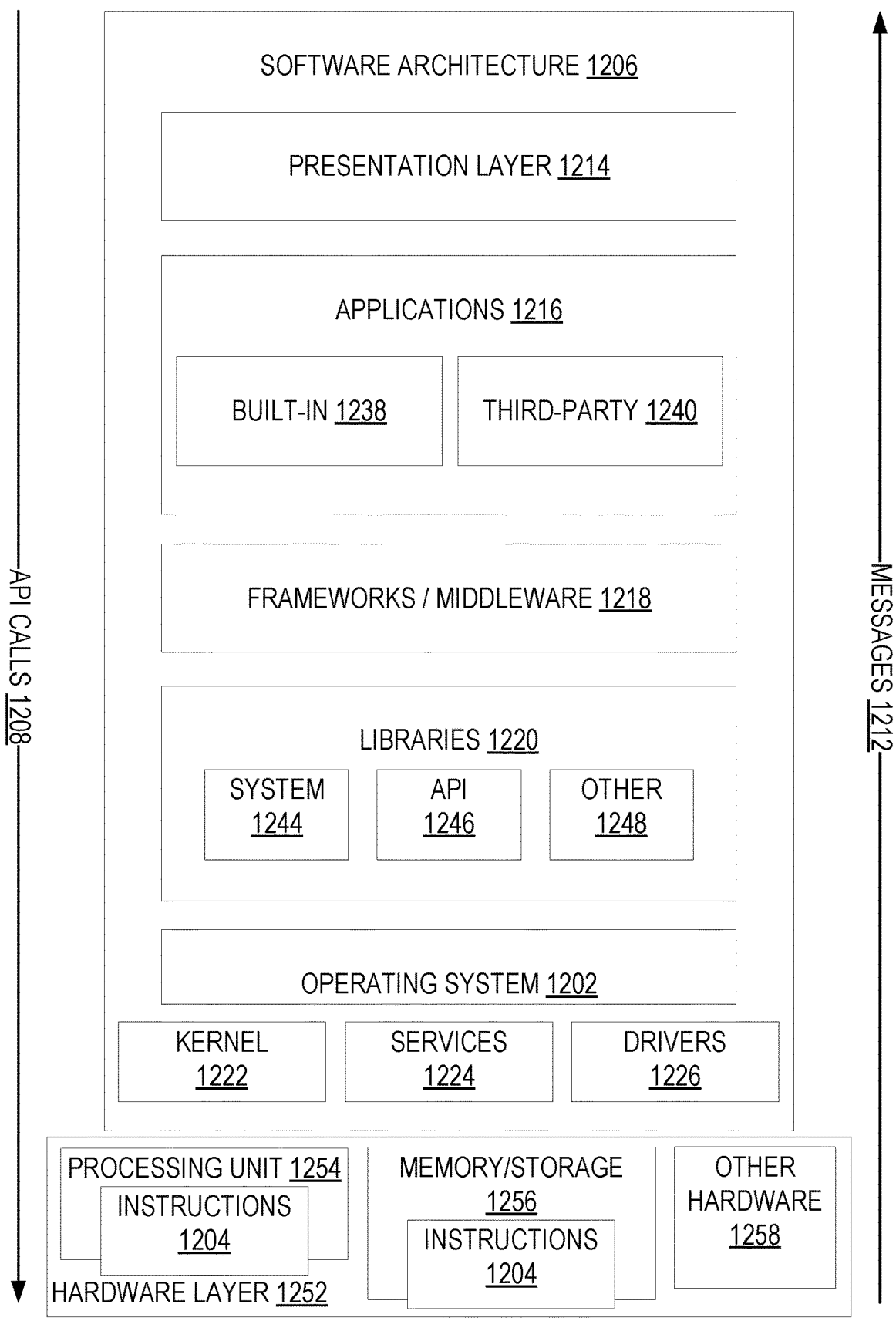
FIG. 12 is a block diagram illustrating a representative software architecture, which may be used in conjunction with various hardware architectures herein described, according to example embodiments.

FIG. 12 is a block diagram illustrating an example software architecture 1206, which may be used in conjunction with various hardware architectures herein described. FIG. 12 is a non-limiting example of a software architecture and it will be appreciated that many other architectures may be implemented to facilitate the functionality described herein. The software architecture 1206 may execute on hardware such as machine 1300 of FIG. 13 that includes, among other things, processors 1304, memory 1314, and input/output (I/O) components 1318. A representative hardware layer 1252 is illustrated and can represent, for example, the machine 1300 of FIG. 13. The representative hardware layer 1252 includes a processing unit 1254 having associated executable instructions 1204. Executable instructions 1204 represent the executable instructions of the software architecture 1206, including implementation of the methods, components, and so forth described herein. The hardware layer 1252 also includes memory and/or storage modules memory/storage 1256, which also have executable instructions 1204. The hardware layer 1252 may also comprise other hardware 1258.

In the example architecture of FIG. 12, the software architecture 1206 may be conceptualized as a stack of layers where each layer provides particular functionality. For example, the software architecture 1206 may include layers such as an operating system 1202, libraries 1220, frameworks/middleware 1218, applications 1216, and a presentation layer 1214. Operationally, the applications 1216 and/or other components within the layers may invoke API calls 1208 through the software stack and receive messages 1212 in response to the API calls 1208. The layers illustrated are representative in nature and not all software architectures have all layers. For example, some mobile or special purpose operating systems may not provide a frameworks/middleware 1218, while others may provide such a layer. Other software architectures may include additional or different layers.

The operating system 1202 may manage hardware resources and provide common services. The operating system 1202 may include, for example, a kernel 1222, services 1224, and drivers 1226. The kernel 1222 may act as an abstraction layer between the hardware and the other software layers. For example, the kernel 1222 may be responsible for memory management, processor management (e.g., scheduling), component management, networking, security settings, and so on. The services 1224 may provide other common services for the other software layers. The drivers 1226 are responsible for controlling or interfacing with the underlying hardware. For instance, the drivers 1226 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1220 provide a common infrastructure that is used by the applications 1216 and/or other components and/or layers. The libraries 1220 provide functionality that allows other software components to perform tasks in an easier fashion than to interface directly with the underlying operating system 1202 functionality (e.g., kernel 1222, services 1224 and/or drivers 1226). The libraries 1220 may include system libraries 1244 (e.g., C standard library) that may provide functions such as memory allocation functions, string manipulation functions, mathematical functions, and the like. In addition, the libraries 1220 may include API libraries 1246 such as media libraries (e.g., libraries to support presentation and manipulation of various media format such as MPREG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 1220 may also include a wide variety of other libraries 1248 to provide many other APIs to the applications 1216 and other software components/modules.

The frameworks/middleware 1218 (also sometimes referred to as middleware) provide a higher-level common infrastructure that may be used by the applications 1216 and/or other software components/modules. For example, the frameworks/middleware 1218 may provide various graphic UI (GUI) functions, high-level resource management, high-level location services, and so forth. The frameworks/middleware 1218 may provide a broad spectrum of other APIs that may be utilized by the applications 1216 and/or other software components/modules, some of which may be specific to a particular operating system 1202 or platform.

The applications 1216 include built-in applications 1238 and/or third-party applications 1240. Examples of representative built-in applications 1238 may include, but are not limited to, a contacts application, a browser application, a book reader application, a location application, a media application, a messaging application, and/or a game application. Third-party applications 1240 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1240 may invoke the API calls 1208 provided by the mobile operating system (such as operating system 1202) to facilitate functionality described herein.

The applications 1216 may use built-in operating system functions (e.g., kernel 1222, services 1224, and/or drivers 1226), libraries 1220, and frameworks/middleware 1218 to create UIs to interact with users of the system. Alternatively, or additionally, in some systems interactions with a user may occur through a presentation layer, such as presentation layer 1214. In these systems, the application/component "logic" can be separated from the aspects of the application/component that interact with a user.

Figure 13:
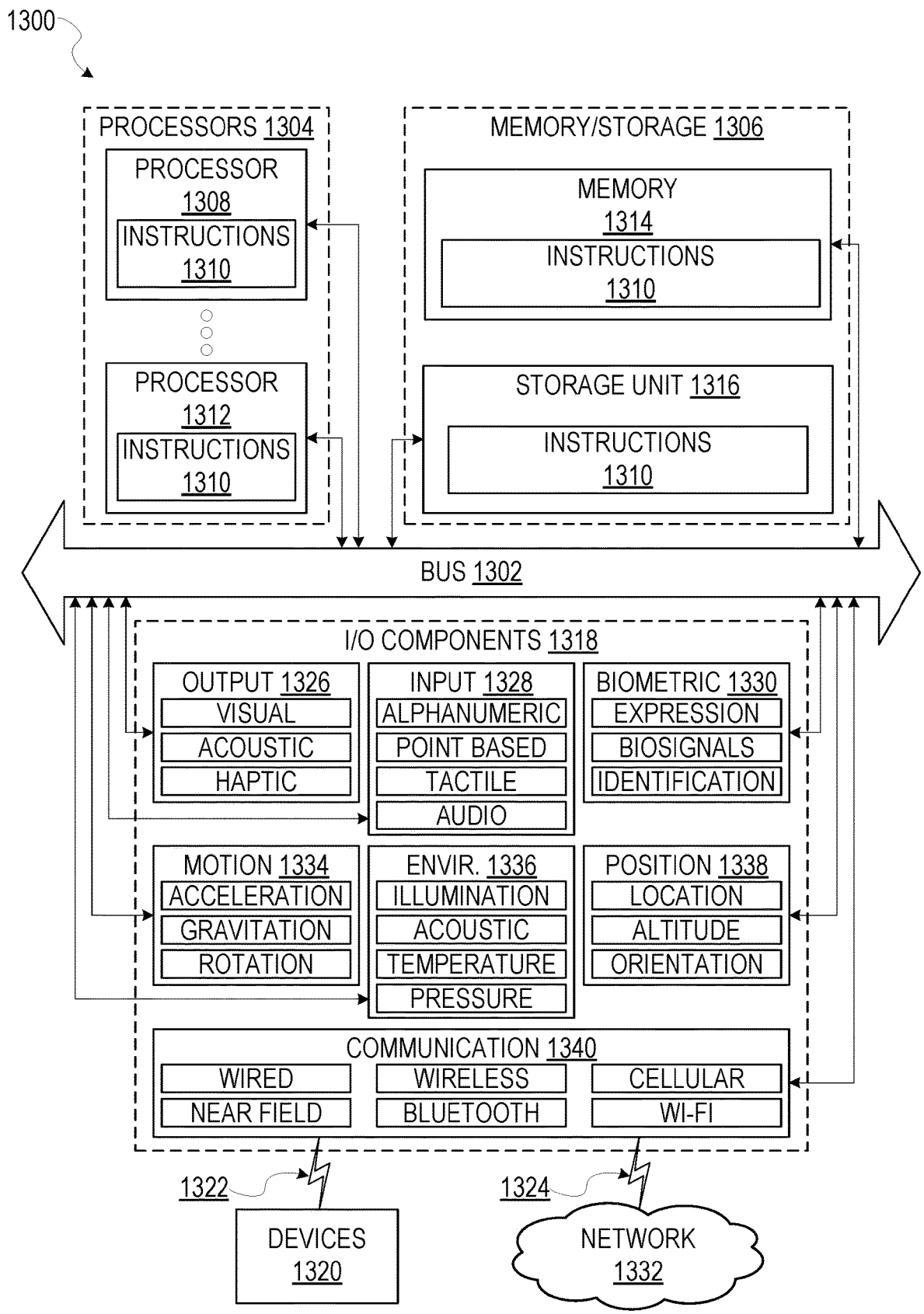
FIG. 13 is a block diagram illustrating components of a machine able to read instructions from a machine-readable medium (e.g., a machine-readable storage medium) and perform any one or more of the methodologies discussed herein, according to example embodiments.

FIG. 13 is a block diagram illustrating components of a machine 1300, according to some example embodiments, able to read instructions from a machine-readable medium (e.g., a machine-readable storage medium) and perform any one or more of the methodologies discussed herein. Specifically, FIG. 13 shows a diagrammatic representation of the machine 1300 in the example form of a computer system, within which instructions 1310 (e.g., software, a program, an application, an applet, an app, or other executable code) for causing the machine 1300 to perform any one or more of the methodologies discussed herein may be executed. As such, the instructions 1310 may be used to implement modules or components described herein. The instructions 1310 transform the general, non-programmed machine 1300 into a particular machine 1300 programmed to carry out the described and illustrated functions in the manner described. In alternative embodiments, the machine 1300 operates as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1310, sequentially or otherwise, that specify actions to be taken by machine 1300. Further, while only a single machine 1300 is illustrated, the term "machine" shall also be taken to include a collection of machines that individually or jointly execute the instructions 1310 to perform any one or more of the methodologies discussed herein.

The machine 1300 may include processors 1304, memory memory/storage 1306, and I/O components 1318, which may be configured to communicate with each other such as via a bus 1302. In an example embodiment, the processors 1304 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1308 and a processor 1312 that may execute the instructions 1310. The term "processor" is intended to include multi-core processors 1304 that may comprise two or more independent processors (sometimes referred to as "cores") that may execute instructions contemporaneously. Although FIG. 13 shows multiple processors 1304, the machine 1300 may include a single processor with a single core, a single processor with multiple cores (e.g., a multi-core processor), multiple processors with a single core, multiple processors with multiple cores, or any combination thereof.

The memory/storage 1306 may include a memory 1314, such as a main memory, or other memory storage, and a storage unit 1316, both accessible to the processors 1304 such as via the bus 1302. The storage unit 1316 and memory 1314 store the instructions 1310 embodying any one or more of the methodologies or functions described herein. The instructions 1310 may also reside, completely or partially, within the memory 1314, within the storage unit 1316, within at least one of the processors 1304 (e.g., within the processor's cache memory), or any suitable combination thereof, during execution thereof by the machine 1300. Accordingly, the memory 1314, the storage unit 1316, and the memory of processors 1304 are examples of machine-readable media.

The I/O components 1318 may include a wide variety of components to receive input, provide output, produce output, transmit information, exchange information, capture measurements, and so on. The specific I/O components 1318 that are included in a particular machine 1300 will depend on the type of machine. For example, portable machines such as mobile phones will likely include a touch input device or other such input mechanisms, while a headless server machine will likely not include such a touch input device. It will be appreciated that the I/O components 1318 may include many other components that are not shown in FIG. 13. The I/O components 1318 are grouped according to functionality merely for simplifying the following discussion and the grouping is in no way limiting. In various example embodiments, the I/O components 1318 may include output components 1326 and input components 1328. The output components 1326 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1328 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1318 may include biometric components 1330, motion components 1334, environmental components 1336, or position components 1338 among a wide array of other components. For example, the biometric components 1330 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1334 may include acceleration sensor components (e.g., accelerometer), gravitation sensor components, rotation sensor components (e.g., gyroscope), and so forth. The environmental components 1336 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1338 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1318 may include communication components 1340 operable to couple the machine 1300 to a network 1332 or devices 1320 via coupling 1324 and coupling 1322, respectively. For example, the communication components 1340 may include a network interface component or other suitable device to interface with the network 1332. In further examples, communication components 1340 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1320 may be another machine or any of a wide variety of peripheral devices (e.g., a peripheral device coupled via a USB).

Moreover, the communication components 1340 may detect identifiers or include components operable to detect identifiers. For example, the communication components 1340 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1340, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying transitory or non-transitory instructions for execution by the machine, and includes digital or analog communications signals or other intangible medium to facilitate communication of such instructions. Instructions may be transmitted or received over the network using a transitory or non-transitory transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE" in this context refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code,", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
  causing, by one or more processors, a conversation interface in a messaging application to be displayed, wherein the conversation interface enables a plurality of participants in a conversation to exchange messages with one another;
  determining an attribute of a display region in which to display a list of a plurality of a ng applications to one of the plurality of participants in the conversation; and
  based on the determined attribute of the display region, causing display of a plurality of images corresponding to the plurality of gaming applications in the display region, wherein the plurality of images are user-selectable to access data associated with the plurality of gaming applications, and wherein each of the plurality of images is selected from a respective plurality of gaming application image formats comprising:
  a horizontal image having a width greater than a height,
  a square image having equal sized width and height, and
  a vertical image having a width smaller than a height.

2. The method of claim 1, wherein the attribute comprises a size of the display region, further comprising:
  receiving a request from a participant of the plurality of participants to view a list, wherein the list comprises the plurality of gaming applications; and
  based on the determined size of the display region, selecting a presentation format for displaying the list, wherein the plurality of images are user-selectable to launch the plurality of gaming applications, respectively.

3. The method of claim I, wherein determining the attribute of the display region comprises computing a height-to-width ratio of the display region, and wherein the height is a fixed value, and wherein the width is a function of a device type being used to display the list.

4. The method of claim 1, further comprising determining a type of device being used to present the conversation interface, wherein a presentation format for the display of the plurality of images is selected based on the type of device.

5. The method of claim 1, further comprising storing a plurality of first gaming application images representing a first gaming application of the plurality of gaming applications, wherein each of the plurality of first gaming application images has a different aspect ratio.

6. The method of claim 5, further comprising:
computing a total number of gaming applications; and
selecting a first image to represent the first gaming application based on the total number of gaming applications and a size of the display region.

7. The method of claim 1, further comprising:
storing a plurality of first gaming application images representing a first gaming application of the plurality gaming applications.

8. The method of claim 1, further comprising:
selecting the horizontal image for representing a first gaining application in response to determining that a size of the display region is:
less than a specified size, and a total number of gaming applications is one or within a first range of numbers; or
greater than the specified size, and the total number of gaming applications is within a second range of numbers less than the first range of numbers.

9. The method of claim 1, further comprising:
selecting the square image for representing a first gaining application in response to determining that the size of the display region is:
less than a specified size, and a total number of gaming applications is two; or
greater than the specified size, and the total number of gaming applications is one or within a first range of numbers.

10. The method of claim 1, further comprising:
selecting the vertical image for representing a first gaming application in response to determining that the size of the display region is:
less than a specified size, and a total number of gaming applications is three or more than a first threshold; or
greater than the specified size, and the total number of gaming applications is more than a second threshold that is less than the first threshold.

11. The method of claim 1, further comprising:
computing a total number of gaming applications; and
determining a per row number of the plurality of images to include in each row based on the total number of gaming applications and the attribute of the display region.

12. The method of claim 11, further comprising:
generating a presentation format that includes a single image in each row in response to determining that a size of the display region is:
less than a specified size, and the total number of gaming applications is one; or
greater than the specified size, and the total number of gaming applications is between one and three.

13. The method of claim 11, further comprising:
generating a presentation format that includes no more than two images in each row in response to determining that a size of the display region is:
less than a specified size, and the total number of gaming applications is two or within a first range of numbers; or
greater than the specified size, and the total number of gaming applications is between a second range of numbers that overlaps the first range of numbers.

14. The method of claim 11 further comprising:
generating a presentation format that includes no more than three images in each row in response to determining that a size of the display region is:
less than a specified size, and the total number of gaming applications is three; or
greater than the specified size, and the total number of gaming applications is greater than a given threshold.

15. The method of claim 11 further comprising:
generating a presentation format that includes no more than four images in each row in response to determining that a size of the display region is less than a specified size, and the total number of gaming applications is more than eight.

16. A system comprising:
a processor configured to perform operations comprising:
causing a conversation interface in a messaging application to he displayed, wherein the conversation interface enables a plurality of participants in a conversation to exchange messages with one another;
determining an attribute of a display region in which to display a list of a plurality of gaming applications to one of the plurality of participants in the conversation; and
based on the determined attribute of the display region, causing display of a plurality of images corresponding to the plurality of gaming applications in the display region, wherein the plurality of images are user-selectable to access data associated with the plurality of gaming applications, and wherein each of the plurality of images is selected from a respective plurality of gaming application image formats comprising:
a horizontal image having a width greater than a height;
a square image having equal sized width and height, and
a vertical image having a width smaller than a height.

17. The system of claim 16, wherein the attribute comprises a size of the display region, and wherein the operations further comprise:
receiving a request from a participant of the plurality of participants to view a list, wherein the list comprises the plurality of gaming applications; and
based on the determined size of the display region, selecting a presentation format for displaying the list, wherein the plurality of images are user-selectable to launch the plurality of gaming applications, respectively.

18. The system of claim 16, wherein determining the attribute of the display region comprises computing a height-to-width ratio of the display region, and wherein the height is a fixed value, and wherein the width is a function of a device type being used to display the list.

19. A computing device comprising:
a display screen;
a processor; and
a memory having stored thereon instructions, when executed by the processor, causes the computing device to perform operations comprising:
causing a conversation interface in a messaging application to be displayed, wherein the conversation interface enables a plurality of participants in a conversation to exchange messages with one another;

determining an attribute of a display region in which to display a list of a plurality of gaming applications to one of the plurality of participants in the conversation; and based on the determined attribute of the display region, causing display of a plurality of images corresponding to the plurality of gaming applications in the display region, wherein the plurality of images are user-selectable to access data associated with the plurality of gaming applications, and wherein each of the plurality of images is selected from a respective plurality of gaming application image formats comprising:

a horizontal image having a width greater than a height,
a square image having equal sized width and height, and
a vertical image having a width smaller than a height.

20. The computing device of claim 19, wherein the attribute comprises a size of the display region, and wherein the operations further comprise:

receiving a request from a participant of the plurality of participants to view a list, wherein the list comprises the plurality of gaming applications; and based on the determined size of the display region, selecting a presentation format for displaying the list, wherein the plurality of images are user-selectable to launch the plurality of gaming applications, respectively.

* * * * *

UNITED STATES PATENT AND TRADEMARK OFFICE
CERTIFICATE OF CORRECTION

PATENT NO. : 11,491,406 B2
APPLICATION NO. : 16/949917
DATED : November 8, 2022
INVENTOR(S) : Wu et al.

It is certified that error appears in the above-identified patent and that said Letters Patent is hereby corrected as shown below:

In the Claims

In Column 36, Line 40, in Claim 1, delete "a ng" and insert --gaming-- therefor

In Column 36, Line 63, in Claim 3, delete "claim I," and insert --claim 1,-- therefor In Column 37, Line 23, in Claim 8, delete "gaining" and insert --gaming-- therefor In Column 37, Line 31, in Claim 9, delete "claim 1;" and insert --claim 1,-- therefor In Column 37, Line 32, in Claim 9, delete "gaining" and insert --gaming-- therefor In Column 38, Line 24, in Claim 16, delete "he" and insert --be-- therefor In Column 38, Line 39, in Claim 16, delete "height;" and insert --height,-- therefor Signed and Sealed this
Nineteenth Day of September, 2023

Katherine Kelly Vidal
*Director of the United States Patent and Trademark Office*